United States Patent
Monden et al.

(10) Patent No.: US 9,450,250 B2
(45) Date of Patent: *Sep. 20, 2016

(54) CATALYST, PRODUCTION PROCESS THEREFOR AND USE THEREOF

(71) Applicant: SHOWA DENKO K.K., Tokyo (JP)

(72) Inventors: Ryuji Monden, Chiba (JP); Tadatoshi Kurozumi, Chiba (JP); Toshikazu Shishikura, Chiba (JP); Yasuaki Wakizaka, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/754,328

(22) Filed: Jun. 29, 2015

(65) Prior Publication Data

US 2015/0372311 A1 Dec. 24, 2015

Related U.S. Application Data

(62) Division of application No. 12/933,830, filed as application No. PCT/JP2009/055700 on Mar. 23, 2009, now Pat. No. 9,099,749.

(30) Foreign Application Priority Data

Mar. 24, 2008 (JP) .................................. 2008-074826

(51) Int. Cl.
*H01M 4/90* (2006.01)
*H01M 4/88* (2006.01)
*C01B 21/082* (2006.01)
*B01J 27/24* (2006.01)
(Continued)

(52) U.S. Cl.
CPC ............ *H01M 4/88* (2013.01); *C01B 21/0828* (2013.01); *H01M 4/90* (2013.01); *H01M 4/9016* (2013.01); *B01J 27/24* (2013.01); *H01M 4/92* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

| | | |
|---|---|---|
| 3,492,100 A | 1/1970 | Roubin et al. |
| 5,188,908 A | 2/1993 | Nishiyama et al. |
| 5,275,981 A | 1/1994 | Nishiyama et al. |

(Continued)

FOREIGN PATENT DOCUMENTS

| | | |
|---|---|---|
| CN | 101171712 A | 4/2008 |
| GB | 1213999 | 11/1970 |

(Continued)

OTHER PUBLICATIONS

Extended European Search Report dated Oct. 17, 2013 for corresponding Application No. EP 09 72 4789.

(Continued)

*Primary Examiner* — Tracy Dove
(74) *Attorney, Agent, or Firm* — Sughrue Mion, PLLC

(57) ABSTRACT

Catalysts of the present invention are not corroded in acidic electrolytes or at high potential and have excellent durability and high oxygen reducing ability. The catalyst includes a metal oxycarbonitride containing two metals M selected from the group consisting of tin, indium, platinum, tantalum, zirconium, titanium, copper, iron, tungsten, chromium, molybdenum, hafnium, vanadium, cobalt, cerium, aluminum and nickel, and containing zirconium and/or titanium. Also disclosed is a process for producing the catalyst.

6 Claims, 17 Drawing Sheets

(51) Int. Cl.
*H01M 4/92* (2006.01)
*H01M 8/10* (2016.01)

(56) References Cited

U.S. PATENT DOCUMENTS

| | | | |
|---|---|---|---|
| 5,811,624 A | 9/1998 | Hantzer et al. | |
| 6,168,694 B1 | 1/2001 | Huang et al. | |
| 7,767,330 B2 | 8/2010 | Merzougui et al. | |
| 8,703,638 B2* | 4/2014 | Wakizaka | B01J 27/24 427/249.1 |
| 8,709,964 B2* | 4/2014 | Ewald | B01J 27/22 429/523 |
| 9,048,499 B2* | 6/2015 | Wakizaka | H01M 4/9016 |
| 2010/0094207 A1* | 4/2010 | Boyd | A61M 5/31555 604/68 |
| 2010/0227253 A1 | 9/2010 | Monden et al. | |
| 2011/0053049 A1* | 3/2011 | Imai | H01M 4/9008 429/523 |
| 2013/0115542 A1* | 5/2013 | Imai | H01M 4/90 429/482 |

FOREIGN PATENT DOCUMENTS

| | | |
|---|---|---|
| JP | 2003-012375 A | 1/2003 |
| JP | 2003-342058 A | 12/2003 |
| JP | 2006-107967 A | 4/2006 |
| JP | 2006-134603 A | 5/2006 |
| JP | 2007-031781 A | 2/2007 |
| JP | 2008-108594 A | 5/2008 |
| WO | 2009/031383 A1 | 3/2009 |

OTHER PUBLICATIONS

Canadian Office Action issued in corresponding Canadian Application No. 2719313 dated Feb. 20, 2012.

Y. Ohgi et al., "Catalytic activity of partially-oxidized transition metal carbonitrides for oxygen reduction reaction", The Electrochemical Society for Japan Dai 74 Kai Taikai Koen Yoshishu, Mar. 29, 2007, p. 94.

Doi et al, "Zirconium-Based Compounds for Cathode of Polymer Electrolyte Fuel Cell", J Electrochem Society, 2007, 154 (3), pp. B362-B369.

\* cited by examiner

CATALYST, PRODUCTION PROCESS THEREFOR AND USE THEREOF

CROSS-REFERENCE TO RELATED APPLICATIONS

This is a Divisional application of U.S. application Ser. No. 12/933,830 filed Sep. 21, 2010 which is a 371 of PCT International Application No. PCT/JP2009/055700 filed Mar. 23, 2009, which claims benefit of Japanese Patent Application No. 2008-074826 filed Mar. 24, 2008. The above-noted applications are incorporated herein by reference in their entirety.

FIELD OF THE INVENTION

The present invention relates to catalysts, processes for producing the same, and uses of the catalysts.

BACKGROUND OF THE INVENTION

Fuel cells are classified into several types according to the electrolytes or electrodes used therein. Typical types are alkaline types, phosphoric acid types, molten carbonate types, solid electrolyte types and polymer electrolyte types. In particular, polymer electrolyte fuel cells that can operate at temperatures ranging from low temperatures (about −40° C.) to about 120° C. attract attention and are progressively developed and practically used as power sources for low pollution automobiles. The polymer electrolyte fuel cells are expected to be used as automobile drive sources or stationary power sources. The use in these applications requires long-term durability.

The polymer electrolyte fuel cell has a solid polymer electrolyte sandwiched between an anode and a cathode. A fuel is fed to the anode, and oxygen or air is supplied to the cathode, whereby oxygen is reduced at the cathode to produce electricity. The fuel is usually hydrogen or methanol.

To increase the reaction rate in fuel cells and enhance the energy conversion efficiency, a layer containing a catalyst (hereinafter, also the fuel cell catalyst layer) is conventionally provided on the surface of a cathode (an air electrode) or an anode (a fuel electrode) of fuel cells.

Here, noble metals are generally used as the catalysts. Of the noble metals, platinum that is stable at high potential and has high catalytic activity is most frequently used. However, since platinum is expensive and exists in a limited amount, alternative catalysts have been desired.

Further, the noble metals used on a cathode surface are often dissolved in an acidic atmosphere and are not suited in applications requiring long-term durability. Accordingly, it has been strongly demanded that catalysts are developed which are not corroded in an acidic atmosphere and have excellent durability and high oxygen reducing ability.

Materials containing nonmetals such as carbon, nitrogen and boron capture attention as alternative catalysts to platinum. The materials containing these nonmetals are inexpensive compared to noble metals such as platinum and are abundant.

Nonpatent Document 1 reports that zirconium-based ZrOxN compounds show oxygen reducing ability.

Patent Document 1 discloses, as platinum-alternative materials, oxygen-reducing electrode materials containing a nitride of one or more elements selected from Groups 4, 5 and 14 in the long periodic table.

However, the materials containing these nonmetals do not provide sufficient oxygen reducing ability for practical use as catalysts.

Patent Document 2 discloses an oxycarbonitride obtained by mixing a carbide, an oxide and a nitride and heating the mixture in vacuum or an inert or non-oxidative atmosphere at 500 to 1500° C.

However, the oxycarbonitride disclosed in Patent Document 2 is a thin-film magnetic head ceramic substrate material, and the use of the oxycarbonitride as catalyst is not considered therein.

Meanwhile, platinum is useful not only as a fuel cell catalyst as described above but as a catalyst in exhaust gas treatment or organic synthesis. However, the expensiveness and the limited amount of platinum have created a need of alternative catalysts in these applications too.

Patent Document 1: JP-A-2007-31781
Patent Document 2: JP-A-2003-342058
Nonpatent Document 1: S. Doi, A. Ishihara, S. Mitsushima, N. Kamiya, and K. Ota, Journal of The Electrochemical Society, 154 (3) B362-B369 (2007)

DISCLOSURE OF THE INVENTION

Problems to be Solved by the Invention

The present invention is aimed at solving the problems in the background art as described above. It is therefore an object of the invention to provide catalysts that are not corroded in acidic electrolytes or at high potential and have excellent durability and high oxygen reducing ability.

Means for Solving the Problems

The present inventors studied diligently to solve the conventional problems in the art. They have then found that catalysts which are formed of a metal oxycarbonitride which contains two specific metals including at least zirconium or titanium are not corroded in acidic electrolytes or at high potential and have excellent durability and high oxygen reducing ability. The present invention has been completed based on the finding.

The present invention is concerned with the following (1) to (16).

(1) A catalyst which comprises a metal oxycarbonitride containing two metals M selected from the group consisting of tin, indium, platinum, tantalum, zirconium, titanium, copper, iron, tungsten, chromium, molybdenum, hafnium, vanadium, cobalt, cerium, aluminum and nickel, and containing zirconium and/or titanium.

(2) The catalyst described in (1), wherein the metals M are selected from the group consisting of tantalum, zirconium, titanium, iron, tungsten, molybdenum, cerium and aluminum.

(3) The catalyst described in (1) or (2), wherein the metal oxycarbonitride is represented by a compositional formula $Zr_aM_bC_xN_yO_z$ or $Ti_aM_bC_xN_yO_z$ (wherein a, b, x, y and z represent a ratio of the numbers of the atoms, $0.01 \leq a < 1$, $0 < b \leq 0.99$, $0.01 \leq x \leq 2$, $0.01 \leq y \leq 2$, $0.01 \leq z \leq 3$, $a+b=1$, and $x+y+z \leq 5$).

(4) The catalyst described in any one of (1) to (3), which is a fuel cell catalyst.

(5) A process for producing a catalyst comprising a metal oxycarbonitride, the process comprising a step (X) of heating a metal carbonitride in an oxygen-containing inert gas to produce a catalyst comprising a metal oxycarbonitride, the metal carbonitride containing two metals M selected from the group consisting of tin, indium, platinum, tantalum, zirconium, titanium, copper, iron, tungsten, chromium, molybdenum, hafnium, vanadium, cobalt, cerium, aluminum and nickel, and containing zirconium and/or titanium.

(6) The process described in (5), which further comprises a step of producing the metal carbonitride by any of steps (a) to (n) below:

(a) a step in which a mixture comprising a metal M (except zirconium)-containing compound and a zirconium-containing compound (wherein at least one of the metal M-containing compound and the zirconium-containing compound is a carbide) is heated in a nitrogen gas or an inert gas containing nitrogen to give a metal carbonitride;

(b) a step in which a mixture comprising a metal M (except titanium)-containing compound and a titanium-containing compound (wherein at least one of the metal M-containing compound and the titanium-containing compound is a carbide) is heated in a nitrogen gas or an inert gas containing nitrogen to give a metal carbonitride;

(c) a step in which a mixture comprising a metal M (except zirconium) oxide, zirconium oxide and carbon is heated in a nitrogen gas or an inert gas containing nitrogen to give a metal carbonitride;

(d) a step in which a mixture comprising a metal M (except titanium) oxide, titanium oxide and carbon is heated in a nitrogen gas or an inert gas containing nitrogen to give a metal carbonitride;

(e) a step in which a mixture comprising a metal M (except zirconium) oxide, zirconium carbide and zirconium nitride is heated in a nitrogen gas or an inert gas containing nitrogen to give a metal carbonitride;

(f) a step in which a mixture comprising a metal M (except titanium) oxide, titanium carbide and titanium nitride is heated in a nitrogen gas or an inert gas containing nitrogen to give a metal carbonitride;

(g) a step in which a mixture comprising a metal M (except zirconium) oxide, zirconium carbide, zirconium nitride and zirconium oxide is heated in a nitrogen gas or an inert gas containing nitrogen to give a metal carbonitride;

(h) a step in which a mixture comprising a metal M (except titanium) oxide, titanium carbide, titanium nitride and titanium oxide is heated in a nitrogen gas or an inert gas containing nitrogen to give a metal carbonitride;

(i) a step in which a mixture comprising a metal M (except zirconium) carbide, a metal M (except zirconium) nitride and zirconium oxide is heated in a nitrogen gas or an inert gas containing nitrogen to give a metal carbonitride;

(j) a step in which a mixture comprising a metal M (except titanium) carbide, a metal M (except titanium) nitride and titanium oxide is heated in a nitrogen gas or an inert gas containing nitrogen to give a metal carbonitride;

(k) a step in which a mixture comprising a metal M (except zirconium) carbide and zirconium nitride is heated in a nitrogen gas or an inert gas containing nitrogen to give a metal carbonitride;

(l) a step in which a mixture comprising a metal M (except titanium) carbide and titanium nitride is heated in a nitrogen gas or an inert gas containing nitrogen to give a metal carbonitride;

(m) a step in which a mixture comprising a metal M (except zirconium) nitride and zirconium carbide is heated in a nitrogen gas or an inert gas containing nitrogen to give a metal carbonitride;

(n) a step in which a mixture comprising a metal M (except titanium) nitride and titanium carbide is heated in a nitrogen gas or an inert gas containing nitrogen to give a metal carbonitride.

(7) The process described in (6), wherein the heating in the steps (a) to (n) is performed at a temperature in the range of 600 to 2200° C.

(8) The process described in any one of (5) to (7), wherein the heating in the step (X) is performed at a temperature in the range of 400 to 1400° C.

(9) The process described in any one of (5) to (8), wherein the inert gas used in the step (X) has an oxygen gas concentration in the range of 0.1 to 10% by volume.

(10) The process described in any one of (5) to (9), wherein the inert gas used in the step (X) contains hydrogen gas at a concentration of 0.01 to 5% by volume.

(11) A fuel cell catalyst layer comprising the catalyst described in any one of (1) to (4).

(12) The fuel cell catalyst layer described in (11), which further comprises electron conductive particles.

(13) An electrode comprising a fuel cell catalyst layer and a porous support layer, wherein the fuel cell catalyst layer is the fuel cell catalyst layer described in (11) or (12).

(14) A membrane electrode assembly comprising a cathode, an anode and an electrolyte membrane interposed between the cathode and the anode, wherein the cathode and/or the anode is the electrode described in (13).

(15) A fuel cell comprising the membrane electrode assembly described in (14).

(16) A polymer electrolyte fuel cell comprising the membrane electrode assembly described in (14).

Advantageous Effects of the Invention

The catalysts according to the invention are stable and are not corroded in acidic electrolytes or at high potential, have high oxygen reducing ability and are inexpensive compared to platinum. The fuel cells having the catalysts are therefore relatively inexpensive and have high performance.

PREFERRED EMBODIMENTS FOR CARRYING OUT THE INVENTION

<Catalysts>

Figure 1:
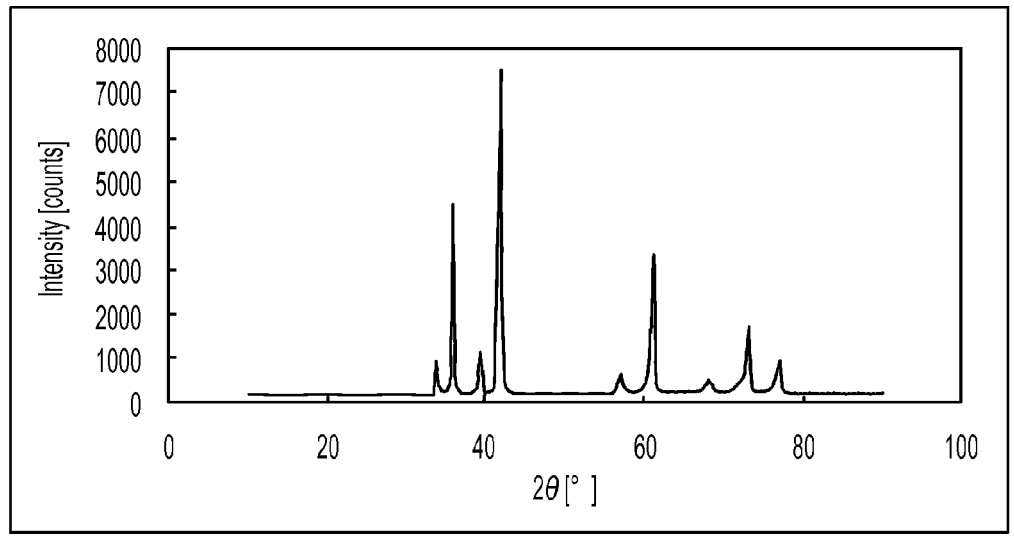
FIG. 1 is a powder X-ray diffraction spectrum of a carbonitride (1) used in Example 1.

A catalyst according to the present invention includes a metal oxycarbonitride which contains two metals M selected from the group consisting of tin, indium, platinum, tantalum, zirconium, titanium, copper, iron, tungsten, chromium, molybdenum, hafnium, vanadium, cobalt, cerium, aluminum and nickel, and which contains zirconium and/or titanium.

In a preferred embodiment, the metals M are selected from the group consisting of tantalum, zirconium, titanium, iron, tungsten, molybdenum, cerium and aluminum.

In a preferred embodiment, the metal oxycarbonitride is represented by a compositional formula $Zr_aM_bC_xN_yO_z$ or $Ti_aM_bC_xN_yO_z$ (wherein a, b, x, y and z represent a ratio of the numbers of the atoms, $0.01 \leq a < 1$, $0 < b \leq 0.99$, $0.01 \leq x \leq 2$, $0.01 \leq y \leq 2$, $0.01 \leq z \leq 3$, $a+b=1$, and $x+y+z \leq 5$). When the metal oxycarbonitride is represented by $Zr_aM_bC_xN_yO_z$, M indicates a metal M other than zirconium (Zr). When the metal oxycarbonitride is represented by $Ti_aM_bC_xN_yO_z$, M indicates a metal M other than titanium (Ti).

In the above compositional formulae, preferably $0.05 \leq a \leq 0.99$, $0.01 \leq b \leq 0.95$ (more preferably $0.50 \leq a \leq 0.99$, $0.01 \leq b \leq 0.50$, still more preferably $0.80 \leq a \leq 0.99$, $0.01 \leq b \leq 0.20$), $0.02 \leq x \leq 2$, $0.01 \leq y \leq 2$, $0.04 \leq z \leq 3$, and $0.07 \leq x+y+z \leq 5$.

When the numbers of the atoms have the above ratio, the obtainable catalysts tend to have an increased oxygen reduction potential.

When the metals M include platinum, the amount of platinum contained in the metal oxycarbonitride is not more than half the total amount of the metals in the metal oxycarbonitride in order to limit the use amount of expensive and scarce platinum. Accordingly, when the metals M include platinum, the letter b in the above compositional formula ($Zr_aM_bC_xN_yO_z$ or $Ti_aM_bC_xN_yO_z$) is not more than 0.50, and preferably not more than 0.20.

In the invention, the "metal oxycarbonitride containing two metals M and containing zirconium and/or titanium" may be a single such compound or a mixture including a metal M oxide, a metal M carbide, a metal M nitride, a metal M carbonitride, a metal M oxycarbide and a metal M oxynitride (the mixture may contain or may not contain a single such compound).

In a preferred embodiment, the above compound shows two or more diffraction peaks at diffraction angles 2θ of 33° to 43° as measured by powder X-ray diffractometry (Cu—Kα radiation).

The diffraction peak is a peak that is observed at a specific diffraction angle and a specific diffraction intensity when a sample (crystal) is irradiated with X-rays at various angles. In the invention, a signal that is detected with a signal (S) to noise (N) ratio (S/N) of 2 or more is regarded as a diffraction peak. Here, the noise (N) is the width of the baseline.

The X-ray diffractometer may be powder X-ray diffractometer Rigaku RAD-RX. The measurement conditions may be X-ray output (Cu—Kα): 50 kV, 180 mA; scan axis: θ/2θ; measurement angles (2θ): 10° to 89.98°; measurement mode: FT; scanning width: 0.02°; sampling time: 0.70 sec; DS, SS and RS: 0.5°, 0.5° and 0.15 mm; goniometer radius: 185 mm.

The catalysts according to the present invention are preferably fuel cell catalysts.

The catalysts in the invention preferably have an oxygen reduction onset potential of not less than 0.5 V as measured versus a reversible hydrogen electrode (vs. NHE) by the measurement method (A) described below.

[Measurement Method (A)]

The catalyst and electron conductive carbon particles are added to a solvent such that the catalyst dispersed in electron conductive carbon particles accounts for 1% by mass. The mixture is ultrasonically stirred to give a suspension. The carbon herein is carbon black (specific surface area: 100-300 m$^2$/g) (e.g., XC-72 manufactured by Cabot Corporation), and the catalyst is dispersed therein with a catalyst:carbon weight ratio of 95:5. The solvent is a mixture of isopropyl alcohol:water (=2:1 by weight).

While ultrasonicating the suspension, a 30 μl portion thereof is collected and is quickly dropped on a glassy carbon electrode (diameter: 5.2 mm) and dried at 120° C. for 1 hour to forma fuel cell catalyst layer containing the catalyst on the glassy carbon electrode.

Subsequently, 10 μl of Nafion (a 5% Nafion solution (DE521) manufactured by Du Pont Kabushiki Kaisha) diluted ten times with pure water is dropped on the fuel cell catalyst layer and is dried at 120° C. for 1 hour.

The electrode manufactured above is polarized in a 0.5 mol/dm$^3$ sulfuric acid solution at 30° C. under an oxygen atmosphere or a nitrogen atmosphere at a potential scanning rate of 5 mV/sec, thereby recording a current-potential curve. As a reference, a reversible hydrogen electrode is polarized in a sulfuric acid solution of the same concentration. In the current-potential curve, the potential at which the reduction current starts to differ by 0.2 µA/cm² or more between the polarization under the oxygen atmosphere and that under the nitrogen atmosphere is obtained as the oxygen reduction onset potential.

If the oxygen reduction onset potential is less than 0.7 V (vs. NHE), the use of the catalyst in a fuel cell cathode may cause the generation of hydrogen peroxide. For the oxygen reduction, the oxygen reduction onset potential is preferably 0.85 V (vs. NHE) or above. A higher oxygen reduction onset potential is more preferable. The upper limit of the oxygen reduction onset potential is not particularly limited but is theoretically 1.23 V (vs. NHE).

The fuel cell catalyst layer according to the invention that is prepared using the inventive catalyst is preferably used at a potential of not less than 0.4 V (vs. NHE) in an acidic electrolyte. The upper limit of the potential depends on the stability of the electrode. The electrode according to the invention may be used at as high a potential as about 1.23 V (vs. NHE) which is the oxygen generation potential.

At a potential of less than 0.4 V (vs. NHE), the compound can exist stably but oxygen cannot be reduced sufficiently. Catalysts having such a low potential are not useful in catalyst layers used in membrane electrode assemblies for fuel cells.

<Catalyst Production Processes>

A process for producing a catalyst comprising a metal oxycarbonitride according to the present invention includes a step (X) of heating a metal carbonitride in an oxygen-containing inert gas, the metal carbonitride containing two metals M selected from the group consisting of tin, indium, platinum, tantalum, zirconium, titanium, copper, iron, tungsten, chromium, molybdenum, hafnium, vanadium, cobalt, cerium, aluminum and nickel, and containing zirconium and/or titanium, thereby to produce a catalyst comprising a metal oxycarbonitride containing the two metals M and containing zirconium and/or titanium.

The catalyst production processes are not particularly limited as long as the processes include the above step (X).

The metal carbonitride used in the step (X) may be obtained by any of steps (a) to (n) below:

(a) a step in which a mixture comprising a metal M (except zirconium)-containing compound and a zirconium-containing compound (wherein at least one of the metal M-containing compound and the zirconium-containing compound is a carbide) is heated in a nitrogen gas or an inert gas containing nitrogen to give a metal carbonitride;

(b) a step in which a mixture comprising a metal M (except titanium)-containing compound and a titanium-containing compound (wherein at least one of the metal M-containing compound and the titanium-containing compound is a carbide) is heated in a nitrogen gas or an inert gas containing nitrogen to give a metal carbonitride;

(c) a step in which a mixture comprising a metal M (except zirconium) oxide, zirconium oxide and carbon is heated in a nitrogen gas or an inert gas containing nitrogen to give a metal carbonitride;

(d) a step in which a mixture comprising a metal M (except titanium) oxide, titanium oxide and carbon is heated in a nitrogen gas or an inert gas containing nitrogen to give a metal carbonitride;

(e) a step in which a mixture comprising a metal M (except zirconium) oxide, zirconium carbide and zirconium nitride is heated in a nitrogen gas or an inert gas containing nitrogen to give a metal carbonitride;

(f) a step in which a mixture comprising a metal M (except titanium) oxide, titanium carbide and titanium nitride is heated in a nitrogen gas or an inert gas containing nitrogen to give a metal carbonitride;

(g) a step in which a mixture comprising a metal M (except zirconium) oxide, zirconium carbide, zirconium nitride and zirconium oxide is heated in a nitrogen gas or an inert gas containing nitrogen to give a metal carbonitride;

(h) a step in which a mixture comprising a metal M (except titanium) oxide, titanium carbide, titanium nitride and titanium oxide is heated in a nitrogen gas or an inert gas containing nitrogen to give a metal carbonitride;

(i) a step in which a mixture comprising a metal M (except zirconium) carbide, a metal M (except zirconium) nitride and zirconium oxide is heated in a nitrogen gas or an inert gas containing nitrogen to give a metal carbonitride;

(j) a step in which a mixture comprising a metal M (except titanium) carbide, a metal M (except titanium) nitride and titanium oxide is heated in a nitrogen gas or an inert gas containing nitrogen to give a metal carbonitride;

(k) a step in which a mixture comprising a metal M (except zirconium) carbide and zirconium nitride is heated in a nitrogen gas or an inert gas containing nitrogen to give a metal carbonitride;

(l) a step in which a mixture comprising a metal M (except titanium) carbide and titanium nitride is heated in a nitrogen gas or an inert gas containing nitrogen to give a metal carbonitride;

(m) a step in which a mixture comprising a metal M (except zirconium) nitride and zirconium carbide is heated in a nitrogen gas or an inert gas containing nitrogen to give a metal carbonitride;

(n) a step in which a mixture comprising a metal M (except titanium) nitride and titanium carbide is heated in a nitrogen gas or an inert gas containing nitrogen to give a metal carbonitride.

The steps (a) to (n) will be described in detail below.

[Steps (a) and (b)]

In the step (a), a mixture comprising a metal M (except zirconium)-containing compound and a zirconium-containing compound (wherein at least one of the metal M-containing compound and the zirconium-containing compound is a carbide) is heated in a nitrogen gas or an inert gas containing nitrogen to give a metal carbonitride. In the step (b), a mixture comprising a metal M (except titanium)-containing compound and a titanium-containing compound (wherein at least one of the metal M-containing compound and the titanium-containing compound is a carbide) is heated in a nitrogen gas or an inert gas containing nitrogen to give a metal carbonitride.

The heating in the steps (a) and (b) is usually performed at a temperature in the range of 600 to 2200° C., and preferably 800 to 2000° C. This heating temperature tends to ensure that the obtainable metal carbonitride has high crystallinity and the amount of unreacted materials is small. The heating at temperatures below 600° C. tends to result in lower crystallinity of the obtainable metal carbonitride and a large amount of unreacted materials. When the heating temperature is above 2200° C., the metal carbonitride tends to be sintered to a higher degree and the crystal thereof tends to grow excessively.

Examples of the metal M-containing compounds as materials include oxides, carbides, nitrides, carbonates, nitrates, carboxylates such as acetates, oxalates and citrates, and phosphates. The oxides include tin oxide, indium oxide, platinum oxide, tantalum oxide, zirconium oxide, titanium oxide, copper oxide, iron oxide, tungsten oxide, chromium oxide, molybdenum oxide, hafnium oxide, vanadium oxide, cobalt oxide, cerium oxide, aluminum oxide and nickel oxide. The carbides include tin carbide, indium carbide, platinum carbide, tantalum carbide, zirconium carbide, titanium carbide, copper carbide, iron carbide, tungsten carbide, chromium carbide, molybdenum carbide, hafnium carbide, vanadium carbide, cobalt carbide, cerium carbide, aluminum carbide and nickel carbide. The nitrides include tin nitride, indium nitride, platinum nitride, tantalum nitride, niobium nitride, zirconium nitride, titanium nitride, copper nitride, iron nitride, tungsten nitride, chromium nitride, molybdenum nitride, hafnium nitride, vanadium nitride, cobalt nitride, cerium nitride, aluminum nitride and nickel nitride. The carbonates include tin carbonate, indium carbonate, platinum carbonate, tantalum carbonate, zirconium carbonate, titanium carbonate, copper carbonate, iron carbonate, tungsten carbonate, chromium carbonate, molybdenum carbonate, hafnium carbonate, vanadium carbonate, cobalt carbonate, cerium carbonate, aluminum carbonate and nickel carbonate. The metal M-containing compounds may be used singly, or two or more kinds may be used in combination without limitation.

Examples of the zirconium-containing or titanium-containing compounds include oxides, carbides, nitrides, carbonates, nitrates, acetates, oxalates, citrates, carboxylates, phosphates and oxychlorides.

Specific examples include $ZrO$, $ZrO_2$, $Zr_2O_5$, $ZrC$, $ZrN$, $ZrCl_2O$, $Ti_3O_4$, $TiO_2$, $Ti_nO_{2n-1}$ (wherein n is an integer of 1 to 20, and preferably 1 to 10), TiC, TiN and $TiCl_2O$.

Carbons may be used as materials. Examples of the carbons include carbon, carbon blacks, graphites, black leads, activated carbons, carbon nanotubes, carbon nanofibers, carbon nanohorns and fullerenes. The carbon preferably has smaller particle diameters. Such carbon particles have a larger specific surface area and react easily with the oxides. A suitable carbon material is carbon black (specific surface area: 100-300 $m^2/g$, for example XC-72 manufactured by Cabot Corporation).

The above materials may be used in any combinations, and the obtainable metal carbonitrides may be heated in an oxygen-containing inert gas to give metal oxycarbonitride catalysts which have a high oxygen reduction onset potential and high activity.

An appropriate metal carbonitride may be produced by controlling the amounts (the molar ratio) of the metal M (except zirconium)-containing compound and the zirconium-containing compound or the amounts (the molar ratio) of the metal M (except titanium)-containing compound and the titanium-containing compound.

With regard to the amounts (the molar ratio), a metal carbonitride prepared with optimum amounts (molar ratio) of the materials tends to give a metal oxycarbonitride having a high oxygen reduction onset potential and high activity.

[Steps (c) and (d)]

In the step (c), a mixture comprising a metal M (except zirconium) oxide, zirconium oxide and carbon is heated in a nitrogen gas or an inert gas containing nitrogen to give a metal carbonitride. In the step (d), a mixture comprising a metal M (except titanium) oxide, titanium oxide and carbon is heated in a nitrogen gas or an inert gas containing nitrogen to give a metal carbonitride.

The heating in the steps (c) and (d) is usually performed at a temperature in the range of 600 to 2200° C., and preferably 800 to 2000° C. This heating temperature tends to ensure that the obtainable metal carbonitride has high crystallinity and the amount of unreacted materials is small. The heating at temperatures below 600° C. tends to result in lower crystallinity of the obtainable metal carbonitride and a large amount of unreacted materials. When the heating temperature is above 2200° C., the metal carbonitride tends to be sintered to a higher degree and the crystal thereof tends to grow excessively.

Examples of the metal M oxides as materials include tin oxide, indium oxide, platinum oxide, tantalum oxide, zirconium oxide, titanium oxide, copper oxide, iron oxide, tungsten oxide, chromium oxide, molybdenum oxide, hafnium oxide, vanadium oxide, cobalt oxide, cerium oxide, aluminum oxide and nickel oxide. The metal M oxides may be used singly, or two or more kinds may be used in combination.

Examples of the zirconium oxides and titanium oxides as materials include $ZrO$, $ZrO_2$, $Zr_2O_5$, $Ti_3O_4$, $TiO_2$ and $Ti_nO_{2n-1}$ (wherein n is an integer of 1 to 20, and preferably 1 to 10).

Examples of the carbons as materials include carbon, carbon blacks, graphites, black leads, activated carbons, carbon nanotubes, carbon nanofibers, carbon nanohorns and fullerenes. The carbon preferably has smaller particle diameters. Such carbon particles have a larger specific surface area and react easily with the oxides. A suitable carbon material is carbon black (specific surface area: 100-300 $m^2/g$, for example XC-72 manufactured by Cabot Corporation).

The above materials may be used in any combinations, and the obtainable metal carbonitrides prepared from a mixture of the metal M (except zirconium) oxide, zirconium oxide and carbon or a mixture of the metal M (except titanium) oxide, titanium oxide and carbon may be heated in an oxygen-containing inert gas to give metal oxycarbonitride catalysts which have a high oxygen reduction onset potential and high activity.

An appropriate metal carbonitride may be produced by controlling the amounts (the molar ratio) of the metal M (except zirconium) oxide, zirconium oxide and carbon or the amounts (the molar ratio) of the metal M (except titanium) oxide, titanium oxide and carbon.

The amounts (the molar ratio) are usually such that the metal M oxide and the carbon are used at 0.01 to 1 mol and 1 to 10 mol, respectively, based on 1 mol of the zirconium oxide or the titanium oxide, and preferably such that the metal M oxide and the carbon are used at 0.01 to 4 mol and 2 to 6 mol, respectively, based on 1 mol of the zirconium oxide or the titanium oxide. These amounts (the molar ratio) tend to ensure that the obtainable metal carbonitride gives a metal oxycarbonitride having a high oxygen reduction onset potential and high activity.

[Steps (e) and (f)]

In the step (e), a mixture comprising a metal M (except zirconium) oxide, zirconium carbide and zirconium nitride is heated in a nitrogen gas or an inert gas containing nitrogen to give a metal carbonitride. In the step (f), a mixture comprising a metal M (except titanium) oxide, titanium carbide and titanium nitride is heated in a nitrogen gas or an inert gas containing nitrogen to give a metal carbonitride.

The heating in the steps (e) and (f) is usually performed at a temperature in the range of 600 to 2200° C., and preferably 800 to 2000° C. This heating temperature tends to ensure that the obtainable metal carbonitride has high crystallinity and the amount of unreacted materials is small. The heating at temperatures below 600° C. tends to result in lower crystallinity of the obtainable metal carbonitride and a large amount of unreacted materials. When the heating temperature is above 2200° C., the metal carbonitride tends to be sintered to a higher degree and the crystal thereof tends to grow excessively.

Materials used herein are a metal M (except zirconium) oxide, zirconium carbide and zirconium nitride, or are a metal M (except titanium) oxide, titanium carbide and titanium nitride.

Examples of the metal M oxides as materials include tin oxide, indium oxide, platinum oxide, tantalum oxide, zirconium oxide, titanium oxide, copper oxide, iron oxide, tungsten oxide, chromium oxide, molybdenum oxide, hafnium oxide, vanadium oxide, cobalt oxide, cerium oxide, aluminum oxide and nickel oxide. The metal M oxides may be used singly, or two or more kinds may be used in combination.

Examples of the zirconium carbides and titanium carbides as materials include ZrC and TiC.

Examples of the zirconium nitrides and titanium nitrides as materials include ZrN and TiN.

The above materials may be used in any combinations, and the obtainable metal carbonitrides prepared from a mixture of the metal M (except zirconium) oxide, zirconium carbide and zirconium nitride or a mixture of the metal M (except titanium) oxide, titanium carbide and titanium nitride may be heated in an oxygen-containing inert gas to give metal oxycarbonitride catalysts which have a high oxygen reduction onset potential and high activity.

An appropriate metal carbonitride may be produced by controlling the amounts (the molar ratio) of the metal M (except zirconium) oxide, zirconium carbide and zirconium nitride. The amounts (the molar ratio) are usually such that the zirconium carbide and the metal M oxide are used at 0.01 to 500 mol and 0.01 to 50 mol, respectively, based on 1 mol of the zirconium nitride, and preferably such that the zirconium carbide and the metal M oxide are used at 0.1 to 300 mol and 0.1 to 30 mol, respectively, based on 1 mol of the zirconium nitride. These amounts (the molar ratio) tend to ensure that the obtainable metal carbonitride gives a metal oxycarbonitride having a high oxygen reduction onset potential and high activity.

In the case where a metal M carbide and a metal M nitride are used instead of the zirconium carbide and the zirconium nitride, the metal M (except zirconium) oxide will be replaced by zirconium oxide.

An appropriate metal carbonitride may be produced by controlling the amounts (the molar ratio) of the metal M (except titanium) oxide, titanium carbide and titanium nitride. The amounts (the molar ratio) are usually such that the titanium carbide and the metal M oxide are used at 0.01 to 500 mol and 0.01 to 50 mol, respectively, based on 1 mol of the titanium nitride, and preferably such that the titanium carbide and the metal M oxide are used at 0.1 to 300 mol and 0.1 to 30 mol, respectively, based on 1 mol of the titanium nitride. These amounts (the molar ratio) tend to ensure that the obtainable metal carbonitride gives a metal oxycarbonitride having a high oxygen reduction onset potential and high activity.

In the case where a metal M carbide and a metal M nitride are used instead of the titanium carbide and the titanium nitride, the metal M (except titanium) oxide will be replaced by titanium oxide.

[Steps (g) and (h)]

In the step (g), a mixture comprising a metal M (except zirconium) oxide, zirconium carbide, zirconium nitride and zirconium oxide is heated in a nitrogen gas or an inert gas containing nitrogen to give a metal carbonitride. In the step (h), a mixture comprising a metal M (except titanium) oxide, titanium carbide, titanium nitride and titanium oxide is heated in a nitrogen gas or an inert gas containing nitrogen to give a metal carbonitride.

The heating in the steps (g) and (h) is usually performed at a temperature in the range of 600 to 2200° C., and preferably 800 to 2000° C. This heating temperature tends to ensure that the obtainable metal carbonitride has high crystallinity and the amount of unreacted materials is small. The heating at temperatures below 600° C. tends to result in lower crystallinity of the obtainable metal carbonitride and a large amount of unreacted materials. When the heating temperature is above 2200° C., the metal carbonitride tends to be sintered to a higher degree and the crystal thereof tends to grow excessively.

Materials used herein are a metal M (except zirconium) oxide, zirconium carbide, zirconium nitride and zirconium oxide, or are a metal M (except titanium) oxide, titanium carbide, titanium nitride and titanium oxide.

Examples of the metal M oxides as materials include tin oxide, indium oxide, platinum oxide, tantalum oxide, zirconium oxide, titanium oxide, copper oxide, iron oxide, tungsten oxide, chromium oxide, molybdenum oxide, hafnium oxide, vanadium oxide, cobalt oxide, cerium oxide, aluminum oxide and nickel oxide. The metal M oxides may be used singly, or two or more kinds may be used in combination.

Examples of the zirconium carbides and titanium carbides as materials include ZrC and TiC.

Examples of the zirconium nitrides and titanium nitrides as materials include ZrN and TiN.

Examples of the zirconium oxides and titanium oxides as materials include ZrO, $ZrO_2$, $Zr_2O_5$, $Ti_3O_4$, $TiO_2$ and $Ti_nO_{2n-1}$ (wherein n is an integer of 1 to 20, and preferably 1 to 10).

The above materials may be used in any combinations, and the obtainable metal carbonitrides prepared from a mixture of the metal M (except zirconium) oxide, zirconium carbide, zirconium nitride and zirconium oxide or a mixture of the metal M (except titanium) oxide, titanium carbide, titanium nitride and titanium oxide may be heated in an oxygen-containing inert gas to give metal oxycarbonitride catalysts which have a high oxygen reduction onset potential and high activity.

An appropriate metal carbonitride may be produced by controlling the amounts (the molar ratio) of the metal M (except zirconium) oxide, zirconium carbide, zirconium nitride and zirconium oxide. The amounts (the molar ratio) are usually such that the zirconium carbide is used at 0.01 to 500 mol and the metal M oxide and the zirconium oxide are used together at 0.01 to 50 mol based on 1 mol of the zirconium nitride, and preferably such that the zirconium carbide is used at 0.1 to 300 mol and the metal M oxide and the zirconium oxide are used together at 0.1 to 30 mol based on 1 mol of the zirconium nitride. These amounts (the molar ratio) tend to ensure that the obtainable metal carbonitride gives a metal oxycarbonitride having a high oxygen reduction onset potential and high activity.

An appropriate metal carbonitride may be produced by controlling the amounts (the molar ratio) of the metal M (except titanium) oxide, titanium carbide, titanium nitride and titanium oxide. The amounts (the molar ratio) are usually such that the titanium carbide is used at 0.01 to 500 mol and the metal M oxide and the titanium oxide are used together at 0.01 to 50 mol based on 1 mol of the titanium nitride, and preferably such that the titanium carbide is used at 0.1 to 300 mol and the metal M oxide and the titanium oxide are used together at 0.1 to 30 mol based on 1 mol of the titanium nitride. These amounts (the molar ratio) tend to ensure that the obtainable metal carbonitride gives a metal oxycarbonitride having a high oxygen reduction onset potential and high activity.

[Steps (i) and (j)]

In the step (i), a mixture comprising a metal M (except zirconium) carbide, a metal M (except zirconium) nitride and zirconium oxide is heated in a nitrogen gas or an inert gas containing nitrogen to give a metal carbonitride. In the step (j), a mixture comprising a metal M (except titanium) carbide, a metal M (except titanium) nitride and titanium oxide is heated in a nitrogen gas or an inert gas containing nitrogen to give a metal carbonitride.

The heating in the steps (i) and (j) is usually performed at a temperature in the range of 600 to 2200° C., and preferably 800 to 2000° C. This heating temperature tends to ensure that the obtainable metal carbonitride has high crystallinity and the amount of unreacted materials is small. The heating at temperatures below 600° C. tends to result in lower crystallinity of the obtainable metal carbonitride and a large amount of unreacted materials. When the heating temperature is above 2200° C., the metal carbonitride tends to be sintered to a higher degree and the crystal thereof tends to grow excessively.

Materials used herein are a metal M carbide, a metal M nitride, and zirconium oxide or titanium oxide.

Examples of the metal M carbides include tin carbide, indium carbide, platinum carbide, tantalum carbide, zirconium carbide, titanium carbide, copper carbide, iron carbide, tungsten carbide, chromium carbide, molybdenum carbide, hafnium carbide, vanadium carbide, cobalt carbide, cerium carbide, aluminum carbide and nickel carbide. The metal M carbides may be used singly, or two or more kinds may be used in combination.

Examples of the metal M nitrides include tin nitride, indium nitride, platinum nitride, tantalum nitride, zirconium nitride, titanium nitride, copper nitride, iron nitride, tungsten nitride, chromium nitride, molybdenum nitride, hafnium nitride, vanadium nitride, cobalt nitride, cerium nitride, aluminum nitride and nickel nitride. The metal M nitrides may be used singly, or two or more kinds may be used in combination.

Examples of the zirconium oxides and titanium oxides as materials include $ZrO$, $ZrO_2$, $Zr_2O_5$, $Ti_3O_4$, $TiO_2$ and $Ti_nO_{2n-1}$ (wherein n is an integer of 1 to 20, and preferably 1 to 10).

The above materials may be used in any combinations, and the obtainable metal carbonitrides prepared from a mixture of the metal M (except zirconium) carbide, metal M (except zirconium) nitride and zirconium oxide or a mixture of the metal M (except titanium) carbide, metal M (except titanium) nitride and titanium oxide may be heated in an oxygen-containing inert gas to give metal oxycarbonitride catalysts which have a high oxygen reduction onset potential and high activity.

An appropriate metal carbonitride may be produced by controlling the amounts (the molar ratio) of the metal M (except zirconium) carbide, metal M (except zirconium) nitride and zirconium oxide. The amounts (the molar ratio) are usually such that the metal M carbide and the zirconium oxide are used at 0.01 to 500 mol and 0.01 to 50 mol, respectively, based on 1 mol of the metal M nitride, and preferably such that the metal M carbide and the zirconium oxide are used at 0.1 to 300 mol and 0.1 to 30 mol, respectively, based on 1 mol of the metal M nitride. These amounts (the molar ratio) tend to ensure that the obtainable metal carbonitride gives a metal oxycarbonitride having a high oxygen reduction onset potential and high activity.

An appropriate metal carbonitride may be produced by controlling the amounts (the molar ratio) of the metal M (except titanium) carbide, metal M (except titanium) nitride and titanium oxide. The amounts (the molar ratio) are usually such that the metal M carbide and the titanium oxide are used at 0.01 to 500 mol and 0.01 to 50 mol, respectively, based on 1 mol of the metal M nitride, and preferably such that the metal M carbide and the titanium oxide are used at 0.1 to 300 mol and 0.1 to 30 mol, respectively, based on 1 mol of the metal M nitride. These amounts (the molar ratio) tend to ensure that the obtainable metal carbonitride gives a metal oxycarbonitride having a high oxygen reduction onset potential and high activity.

[Steps (k) and (l)]

In the step (k), a mixture comprising a metal M (except zirconium) carbide and zirconium nitride is heated in a nitrogen gas or an inert gas containing nitrogen to give a metal carbonitride. In the step (l), a mixture comprising a metal M (except titanium) carbide and titanium nitride is heated in a nitrogen gas or an inert gas containing nitrogen to give a metal carbonitride.

The heating in the steps (k) and (l) is usually performed at a temperature in the range of 600 to 2200° C., and preferably 800 to 2000° C. This heating temperature tends to ensure that the obtainable metal carbonitride has high crystallinity and the amount of unreacted materials is small. The heating at temperatures below 600° C. tends to result in lower crystallinity of the obtainable metal carbonitride and a large amount of unreacted materials. When the heating temperature is above 2200° C., the metal carbonitride tends to be sintered to a higher degree and the crystal thereof tends to grow excessively.

Materials used herein are a metal M carbide, and zirconium nitride or titanium nitride.

Examples of the metal M carbides include tin carbide, indium carbide, platinum carbide, tantalum carbide, zirconium carbide, titanium carbide, copper carbide, iron carbide, tungsten carbide, chromium carbide, molybdenum carbide, hafnium carbide, vanadium carbide, cobalt carbide, cerium carbide, aluminum carbide and nickel carbide. The metal M carbides may be used singly, or two or more kinds may be used in combination.

Examples of the zirconium nitrides and titanium nitrides as materials include ZrN and TiN.

The above materials may be used in any combinations, and the obtainable metal carbonitrides prepared from a mixture of the metal M (except zirconium) carbide and zirconium nitride or a mixture of the metal M (except titanium) carbide and titanium nitride may be heated in an oxygen-containing inert gas to give metal oxycarbonitride catalysts which have a high oxygen reduction onset potential and high activity.

An appropriate metal carbonitride may be produced by controlling the amounts (the molar ratio) of the metal M (except zirconium) carbide and zirconium nitride. The amounts (the molar ratio) are usually such that the metal M carbide is used at 0.01 to 500 mol based on 1 mol of the zirconium nitride, and preferably such that the metal M carbide is used at 0.1 to 300 mol based on 1 mol of the zirconium nitride. These amounts (the molar ratio) tend to ensure that the obtainable metal carbonitride gives a metal oxycarbonitride having a high oxygen reduction onset potential and high activity.

An appropriate metal carbonitride may be produced by controlling the amounts (the molar ratio) of the metal M (except titanium) carbide and titanium nitride. The amounts (the molar ratio) are usually such that the metal M carbide is used at 0.01 to 500 mol based on 1 mol of the titanium nitride, and preferably such that the metal M carbide is used at 0.1 to 300 mol based on 1 mol of the titanium nitride. These amounts (the molar ratio) tend to ensure that the obtainable metal carbonitride gives a metal oxycarbonitride having a high oxygen reduction onset potential and high activity.

[Steps (m) and (n)]

In the step (m), a mixture comprising a metal M (except zirconium) nitride and zirconium carbide is heated in a nitrogen gas or an inert gas containing nitrogen to give a metal carbonitride. In the step (n), a mixture comprising a metal M (except titanium) nitride and titanium carbide is heated in a nitrogen gas or an inert gas containing nitrogen to give a metal carbonitride.

The heating in the steps (m) and (n) is usually performed at a temperature in the range of 600 to 2200° C., and preferably 800 to 2000° C. This heating temperature tends to ensure that the obtainable metal carbonitride has high crystallinity and the amount of unreacted materials is small. The heating at temperatures below 600° C. tends to result in lower crystallinity of the obtainable metal carbonitride and a large amount of unreacted materials. When the heating temperature is above 2200° C., the metal carbonitride tends to be sintered to a higher degree and the crystal thereof tends to grow excessively.

Materials used herein are a metal M nitride, and zirconium carbide or titanium carbide.

Examples of the metal M nitrides include tin nitride, indium nitride, platinum nitride, tantalum nitride, zirconium nitride, titanium nitride, copper nitride, iron nitride, tungsten nitride, chromium nitride, molybdenum nitride, hafnium nitride, vanadium nitride, cobalt nitride, cerium nitride, aluminum nitride and nickel nitride. The metal M nitrides may be used singly, or two or more kinds may be used in combination.

Examples of the zirconium carbides and titanium carbides as materials include ZrC and TiC.

The above materials may be used in any combinations, and the obtainable metal carbonitrides prepared from a mixture of the metal M (except zirconium) nitride and zirconium carbide or a mixture of the metal M (except titanium) nitride and titanium carbide may be heated in an oxygen-containing inert gas to give metal oxycarbonitride catalysts which have a high oxygen reduction onset potential and high activity.

An appropriate metal carbonitride may be produced by controlling the amounts (the molar ratio) of the metal M (except zirconium) nitride and zirconium carbide. The amounts (the molar ratio) are usually such that the zirconium carbide is used at 0.01 to 500 mol based on 1 mol of the metal M nitride, and preferably such that the zirconium carbide is used at 0.1 to 300 mol based on 1 mol of the metal M nitride. These amounts (the molar ratio) tend to ensure that the obtainable metal carbonitride gives a metal oxycarbonitride having a high oxygen reduction onset potential and high activity.

An appropriate metal carbonitride may be produced by controlling the amounts (the molar ratio) of the metal M (except titanium) nitride and titanium carbide. The amounts (the molar ratio) are usually such that the titanium carbide is used at 0.01 to 500 mol based on 1 mol of the metal M nitride, and preferably such that the titanium carbide is used at 0.1 to 300 mol based on 1 mol of the metal M nitride. These amounts (the molar ratio) tend to ensure that the obtainable metal carbonitride gives a metal oxycarbonitride having a high oxygen reduction onset potential and high activity.

Alternatively, the metal carbonitride used in the step (X) may be obtained by the following step (o) or (p).

[Steps (o) and (p)]

In the step (o), a solution of a substance containing a metal M (except zirconium) in a solvent is mixed with zirconium carbonitride, and the solvent is removed and thereby the metal M is adsorbed on the surface of the zirconium carbonitride to give a metal carbonitride. In the step (p), a solution of a substance containing a metal M (except titanium) in a solvent is mixed with titanium carbonitride, and the solvent is removed and thereby the metal M is adsorbed on the surface of the titanium carbonitride to give a metal carbonitride.

Examples of the substances containing a metal M include metal M nitrates, metal M hydrochlorides, metal M halides such as metal M chlorides, organic acid salts of metals M such as metal M acetates, and precursors such as metal M alkoxides.

The solvents are not particularly limited as long as the metals M are dissolved therein. Examples of the solvents include water, alcohols such as methanol, and mineral acids such as hydrochloric acid.

The zirconium carbonitride may be produced by any methods without limitation. For example, (1) zirconium oxide and carbon may be heated in nitrogen gas to give zirconium carbonitride, (2) zirconium carbide and zirconium nitride may be heated in nitrogen gas to give zirconium carbonitride, or (3) zirconium oxide, zirconium nitride and zirconium carbide may be heated in nitrogen gas to give zirconium carbonitride.

The titanium carbonitride may be produced by any methods without limitation. For example, (1) titanium oxide and carbon may be heated in nitrogen gas to give titanium carbonitride, (2) titanium carbide and titanium nitride may be heated in nitrogen gas to give titanium carbonitride, or (3) titanium oxide, titanium nitride and titanium carbide may be heated in nitrogen gas to give titanium carbonitride.

(Step of Producing Metal Oxycarbonitride)

Next, the step (X) will be described below in which the metal carbonitride from the step (a) to (p) is heated in an oxygen-containing inert gas to produce a catalyst comprising a metal oxycarbonitride containing the two metals M and containing zirconium and/or titanium.

Examples of the inert gases include nitrogen gas, helium gas, neon gas, argon gas, krypton gas, xenon gas and radon gas. Nitrogen gas and argon gas are particularly preferable because of their relatively high availability.

The concentration of oxygen gas in the step (X) depends on the heating time and the heating temperature, but is preferably in the range of 0.1 to 10% by volume, and particularly preferably 0.5 to 5% by volume. When the oxygen gas concentration is in this range, the metal carbonitride is oxidized appropriately. If the oxygen gas concentration is below 0.1% by volume, the oxidation tends to fail. If the concentration is in excess of 10% by volume, the oxidation tends to proceed excessively.

The inert gas used in the step (X) may contain hydrogen gas in addition to the oxygen gas. The concentration of hydrogen gas in the inert gas depends on the heating time and the heating temperature, but is preferably in the range of 0.01 to 10% by volume, and particularly preferably 0.01 to 5% by volume. When the hydrogen gas concentration is in this range, the metal carbonitride is oxidized appropriately.

If the hydrogen gas concentration is in excess of 10% by volume, the reduction tends to proceed excessively. In the invention, the gas concentration (% by volume) is determined under standard conditions.

The heating in the step (X) is usually performed at a temperature in the range of 400 to 1400° C., and preferably 600 to 1200° C. This heating temperature ensures that the metal carbonitride is oxidized appropriately. If the heating temperature is below 400° C., the oxidation tends not to proceed. The heating at a temperature above 1400° C. tends to result in excessive oxidation and crystal growth.

The heating methods in the step (X) include a standing method, a stirring method, a dropping method and a powder capturing method.

In the dropping method, an induction furnace is heated to a predetermined heating temperature while flowing an inert gas containing a trace amount of oxygen through the furnace; a thermal equilibrium is maintained at the temperature and the metal carbonitride is dropped and heated in a crucible which is a heating zone in the furnace. The dropping methods provide advantages that the aggregation and growth of particles of the metal carbonitride are minimized.

In the powder capturing method, the metal carbonitride is caused to suspend as particles in an inert gas atmosphere containing a trace amount of oxygen, and the metal carbonitride is captured and heated in a vertical tubular furnace controlled at a predetermined heating temperature.

In the dropping method, the heating time for the metal carbonitride is usually from 0.5 to 10 minutes, and preferably from 0.5 to 3 minutes. This heating time tends to ensure that the metal carbonitride is oxidized appropriately. The heating for less than 0.5 minute tends to result in partial formation of the metal oxycarbonitride. If the heating time exceeds 10 minutes, the oxidation tends to proceed excessively.

In the powder capturing method, the heating time for the metal carbonitride is from 0.2 second to 1 minute, and preferably from 0.2 to 10 seconds. This heating time tends to ensure that the metal carbonitride is oxidized appropriately. The heating for less than 0.2 second tends to result in partial formation of the metal oxycarbonitride. If the heating time exceeds 1 minute, the oxidation tends to proceed excessively. When the heating is performed in a tubular furnace, the heating time for the metal carbonitride may be from 0.1 to 10 hours, and preferably from 0.5 to 5 hours. This heating time tends to ensure that the metal carbonitride is oxidized appropriately. The heating for less than 0.1 hour tends to result in partial formation of the metal oxycarbonitride. If the heating time exceeds 10 hours, the oxidation tends to proceed excessively.

In the invention, the metal oxycarbonitrides obtained by the aforementioned processes may be used directly as catalysts according to the invention. In another embodiment, the metal oxycarbonitride may be crushed into finer particles.

The methods for crushing the metal oxycarbonitrides include roll milling, ball milling, medium stirring milling, and crushing with an air flow crusher, a mortar or a crushing tank. To crush the metal oxycarbonitrides into finer particles, an air flow crusher is preferably used. To facilitate the crushing in small amounts, the use of a mortar is preferable.

<Uses>

The catalysts according to the present invention may be used as catalysts alternative to platinum catalysts.

For example, the catalysts may be used as fuel cell catalysts, exhaust gas treatment catalysts and organic synthesis catalysts.

Fuel cell catalyst layers according to the invention contain the above catalyst.

The fuel cell catalyst layers may be anode catalyst layers or cathode catalyst layers, and the catalysts of the invention may be used in any of these layers. Because the catalysts have excellent durability and high oxygen reducing ability, they are preferably used in cathode catalyst layers.

In a preferred embodiment, the fuel cell catalyst layer further contains electron conductive particles. When the fuel cell catalyst layer containing the catalyst further contains electron conductive particles, the reduction current may be increased, probably because the electron conductive particles establish electrical contacts with the catalyst to induce electrochemical reaction.

The electron conductive particles are generally used as a carrier for the catalyst.

Examples of the materials forming the electron conductive particles include carbons, conductive polymers, conductive ceramics, metals and conductive inorganic oxides such as tungsten oxide and iridium oxide. These materials may be used singly or in combination with one another. In particular, carbon particles having a large specific surface area or a mixture of carbon particles having a large specific surface area and other electron conductive particles is preferable. That is, the fuel cell catalyst layer according to a preferred embodiment contains the catalyst and carbon particles having a large specific surface area.

Examples of the carbons include carbon blacks, graphites, black leads, activated carbons, carbon nanotubes, carbon nanofibers, carbon nanohorns and fullerenes. If the particle diameter of carbon is excessively small, the carbon may not be able to form an electron conductive path. If the particle diameter is excessively large, the fuel cell catalyst layer tends to reduce gas diffusion properties or the catalyst usage rate tends to be lowered. The carbon particle diameter is preferably in the range of 10 to 1000 nm, and more preferably 10 to 100 nm.

When the electron conductive particles are formed of carbon, the mass ratio of the catalyst and the carbon (catalyst:electron conductive particles) is preferably in the range of 4:1 to 1000:1.

The conductive polymers are not particularly limited. Examples thereof include polyacetylene, poly-p-phenylene, polyaniline, polyalkylaniline, polypyrrole, polythiophene, polyindole, poly-1,5-diaminoanthraquinone, polyaminodiphenyl, poly(o-phenylenediamine), poly(quinolinium) salt, polypyridine, polyquinoxaline and polyphenylquinoxaline. Of these, polypyrrole, polyaniline and polythiophene are preferred, and polypyrrole is more preferred.

The fuel cell catalyst layer may further contain a common polymer electrolyte used in fuel cell catalyst layers without limitation. Specific examples include perfluorocarbon polymers having a sulfonic acid group (such as Nafion (a 5% Nafion solution (DE521) manufactured by Du Pont Kabushiki Kaisha), hydrocarbon polymer compounds having a sulfonic acid group, polymer compounds doped with inorganic acids such as phosphoric acid, organic/inorganic hybrid polymers partially substituted with proton conductive functional groups, and proton conductors composed of a polymer matrix impregnated with a phosphoric acid solution or a sulfuric acid solution. Of these, Nafion (a 5% Nafion solution (DE521) manufactured by Du Pont Kabushiki Kaisha) is preferable.

The fuel cell catalyst layers according to the present invention may be used as anode catalyst layers or cathode catalyst layers. The fuel cell catalyst layers contain the catalyst that has high oxygen reducing ability and is resistant to corrosion in acidic electrolytes at high potential. Accordingly, the catalyst layers of the invention are suited for use in fuel cell cathodes (as cathode catalyst layers). In particular, the catalyst layers are suitably provided in cathodes of membrane electrode assemblies in polymer electrolyte fuel cells.

The catalyst may be dispersed on the electron conductive particles as carriers by methods such as airborne dispersion methods and in-liquid dispersion methods. The in-liquid dispersion methods are preferable because the fuel cell catalyst layer may be simply prepared from a dispersion of the catalyst and the electron conductive particles in a solvent. Exemplary in-liquid dispersion methods include an orifice-choked flow method, a rotational shear flow method and an ultrasonic method. The solvents used in the in-liquid dispersion methods are not particularly limited as long as the catalysts or the electron conductive particles are not corroded and are dispersed therein. Volatile liquid organic solvents and water are generally used.

When the catalyst is dispersed on the electron conductive particles, the electrolyte described above and a dispersant may be dispersed together.

The fuel cell catalyst layers may be formed by any methods without limitation. For example, a suspension containing the catalyst, the electron conductive particles and the electrolyte may be applied to an electrolyte membrane or a gas diffusion layer as described later. The application methods include dipping, screen printing, roll coating and spraying. In another embodiment, a suspension containing the catalyst, the electron conductive particles and the electrolyte may be applied or filtered on a substrate to form a fuel cell catalyst layer, and the catalyst layer may be transferred to an electrolyte membrane.

Electrodes according to the present invention contain the fuel cell catalyst layer and a porous support layer.

The electrodes of the invention may be used as cathodes or anodes. The electrodes have excellent durability and high catalytic performance, and are more suitably used as cathodes.

The porous support layer is a layer which diffuses gas (hereinafter, also the gas diffusion layer). The gas diffusion layers are not particularly limited as long as they have electron conductivity, high gas diffusion properties and high corrosion resistance. Carbon-based porous materials such as carbon paper and carbon cloth, and stainless steel and anticorrosive-coated aluminum foils for weight reduction may be generally used.

Membrane electrode assemblies of the invention have a cathode, an anode and an electrolyte membrane between the cathode and the anode. The cathode and/or the anode is the electrode as described hereinabove.

The electrolyte membranes may be general perfluorosulfonic acid electrolyte membranes or hydrocarbon electrolyte membranes. Further, polymer fine-pore membranes impregnated with liquid electrolyte, or porous membranes filled with polymer electrolyte may be used.

Fuel cells according to the present invention have the membrane electrode assemblies as described above.

The electrode reaction in fuel cells takes place at a three-phase interface (electrolyte-electrode catalyst-reaction gas). The fuel cells are classified according to the electrolytes used, into several types such as molten carbonate fuel cells (MCFC), phosphoric acid fuel cells (PAFC), solid oxide fuel cells (SOFC) and polymer electrolyte fuel cells (PEFC). In particular, the membrane electrode assemblies of the invention may be preferably used in polymer electrolyte fuel cells.

EXAMPLES

The present invention will be described based on examples hereinbelow without limiting the scope of the invention.

In Examples and Comparative Examples, measurements were carried out by the following methods.

[Analytical Methods]

1. Powder X-ray Diffractometry

Samples were analyzed by powder X-ray diffractometry using Rotaflex manufactured by Rigaku Corporation.

In the powder X-ray diffractometry of each sample, the number of diffraction peaks was counted in a manner such that a signal which was detected with a signal (S) to noise (N) ratio (S/N) of 2 or more was regarded as a diffraction peak. The noise (N) was the width of the baseline.

2. Elemental Analysis

Carbon: Approximately 0.1 g of a sample was weighed out and analyzed with EMIA-110 manufactured by HORIBA, Ltd.

Nitrogen and oxygen: Approximately 0.1 g of a sample sealed in a Ni cup was analyzed with an ON analyzer (TC600) manufactured by LECO JAPAN CORPORATION.

Zirconium or titanium, and other metals M: Approximately 0.1 g of a sample was weighed on a platinum dish, and an acid was added thereto. The sample was then thermally decomposed. The thermal decomposition product was collected to a predetermined volume, diluted and analyzed with ICP-MS (ICP-OES VISTA-PRO) manufactured by SII.

Example 1

1. Preparation of Catalyst

Titanium (IV) oxide ($TiO_2$) weighing 2.87 g (39.6 mmol) and zirconium oxide ($ZrO_2$) weighing 0.49 g (4 mmol) were mixed with 1.2 g (100 mmol) of carbon (Vulcan 72 manufactured by Cabot Corporation) and were sufficiently crushed. The resultant powder mixture was heated in a tubular furnace in a nitrogen gas at 1800° C. for 3 hours to give 3.05 g of a carbonitride (1) containing zirconium (1 mol %) and titanium. FIG. 1 shows a powder X-ray diffraction spectrum of the carbonitride (1).

Figure 7:
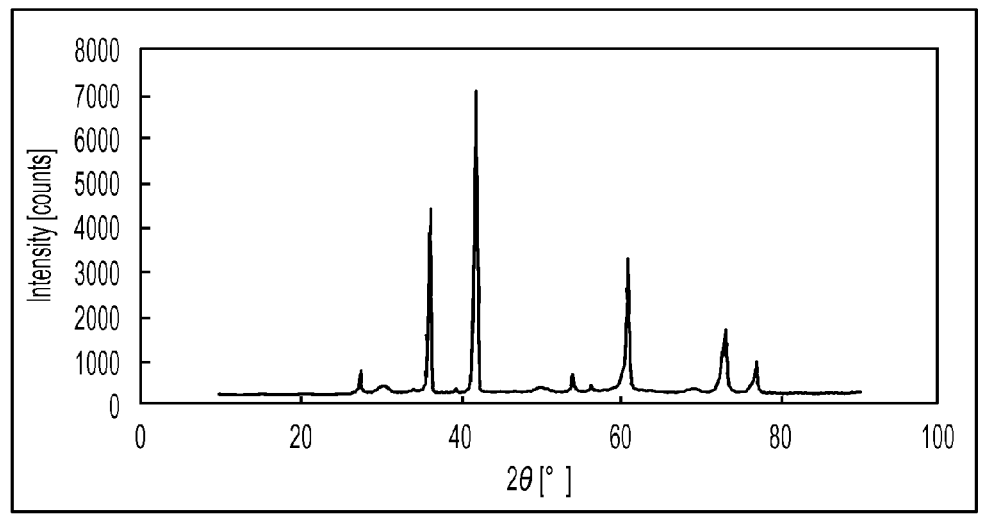
FIG. 7 is a powder X-ray diffraction spectrum of a catalyst (1) in Example 1.

The carbonitride (1) in an amount of 1.02 g was heated in the tubular furnace at 1000° C. for 1 hour while passing an argon gas containing 1% by volume of oxygen gas. As a result, 1.10 g of an oxycarbonitride containing zirconium (1 mol %) and titanium (hereinafter, also the catalyst (1)) was obtained. The results of elemental analysis of the catalyst (1) are set forth in Table 1. A powder X-ray diffraction spectrum of the catalyst (1) is shown in FIG. 7.

2. Production of Fuel Cell Electrode

The oxygen reducing ability was determined in the following manner. The catalyst (1) in an amount of 0.095 g and carbon (XC-72 manufactured by Cabot Corporation) weighing 0.005 g were added to 10 g of a solution consisting of isopropyl alcohol:pure water=2:1 (weight ratio). The mixture was ultrasonically stirred to give a suspended mixture. The mixture in a volume of 30 μl was applied on a glassy carbon electrode (diameter: 5.2 mm, manufactured by Tokai Carbon Co., Ltd.) and was dried at 120° C. for 1 hour. Subsequently, 10 μl of Nafion (a 5% Nafion solution (DE521) manufactured by Du Pont Kabushiki Kaisha)

diluted ten times with pure water was applied thereon and was dried at 120° C. for 1 hour. A fuel cell electrode (1) was thus manufactured.

3. Evaluation of Oxygen Reducing Ability

The fuel cell electrode (1) manufactured above was evaluated for catalytic performance (oxygen reducing ability) as described below.

The fuel cell electrode (1) was polarized in a 0.5 mol/dm$^3$ sulfuric acid solution at 30° C. under an oxygen atmosphere or a nitrogen atmosphere at a potential scanning rate of 5 mV/sec, thereby recording a current-potential curve. As a reference, a reversible hydrogen electrode was polarized in a sulfuric acid solution of the same concentration.

In the current-potential curve obtained, the potential at which the reduction current started to differ by 0.2 μA/cm$^2$ or more between the polarization under the oxygen atmosphere and that under the nitrogen atmosphere was obtained as the oxygen reduction onset potential. The difference between the reduction currents was obtained as the oxygen reduction current.

The catalytic performance (oxygen reducing ability) of the fuel cell electrode (1) was evaluated based on the oxygen reduction onset potential and the oxygen reduction current.

In detail, the higher the oxygen reduction onset potential and the higher the oxygen reduction current, the higher the catalytic performance (oxygen reducing ability) of the fuel cell electrode (1).

Figure 14:
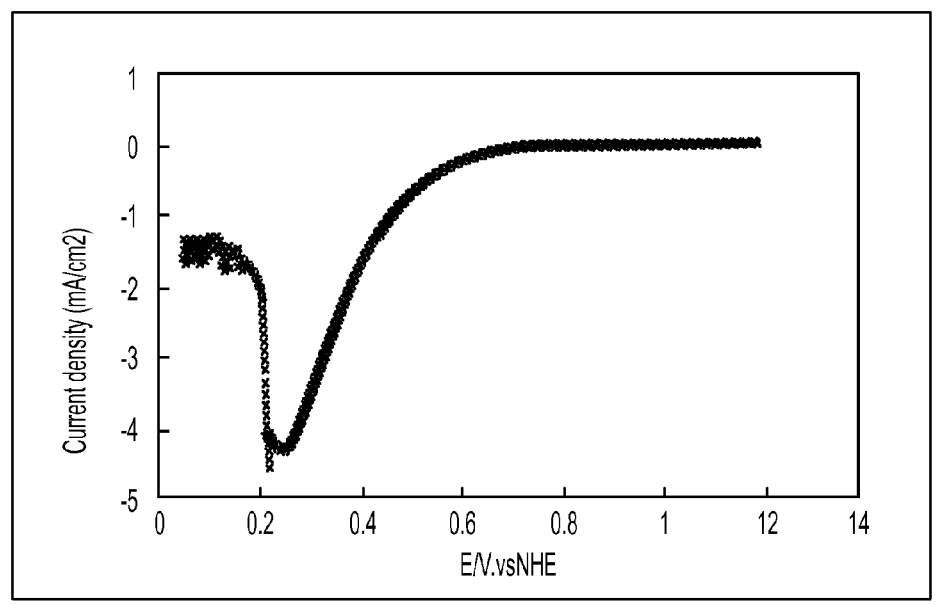
FIG. 14 is a graph showing an evaluation of the oxygen reducing ability of a fuel cell electrode (1) in Example 1.

The oxygen reduction current-oxygen reduction potential curve (hereinafter, also the current-potential curve) recorded during the above measurement is shown in FIG. 14.

The fuel cell electrode (1) manufactured in Example 1 had an oxygen reduction onset potential of 0.82 V (vs. NHE) and was found to have high oxygen reducing ability.

Example 2

1. Preparation of Catalyst

Figure 2:
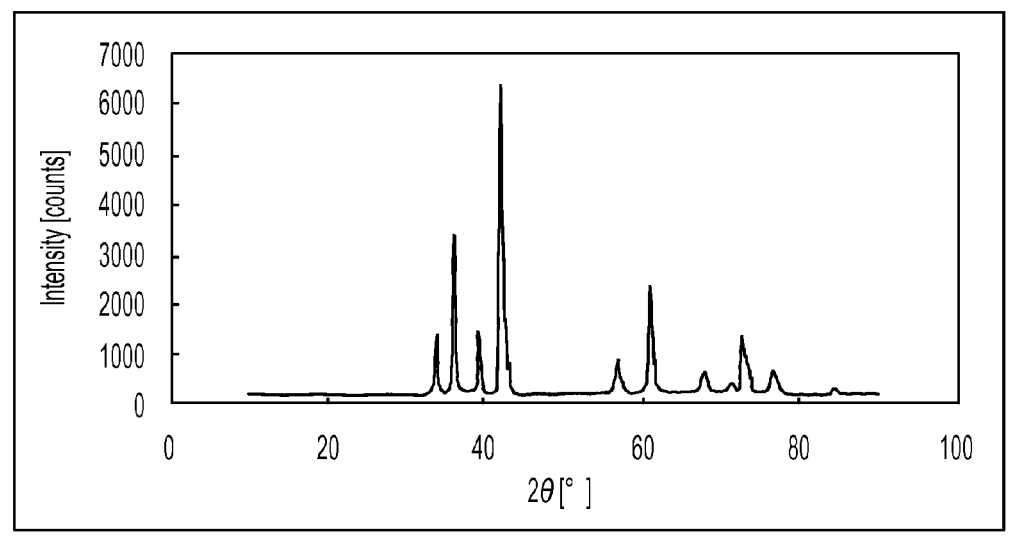
FIG. 2 is a powder X-ray diffraction spectrum of a carbonitride (2) used in Example 2.

Titanium carbide (TiC) weighing 2.55 g (42.5 mmol), zirconium oxide (ZrO$_2$) weighing 0.62 g (5.0 mmol) and titanium nitride (TiN) weighing 0.15 g (2.5 mmol) were mixed together and sufficiently crushed. The resultant powder mixture was heated in a tubular furnace in a nitrogen gas at 1800° C. for 3 hours to give 3.22 g of a carbonitride (2) containing zirconium and titanium. The sintered carbonitride (2) was crushed with a ball mill. FIG. 2 shows a powder X-ray diffraction spectrum of the carbonitride (2).

Figure 8:
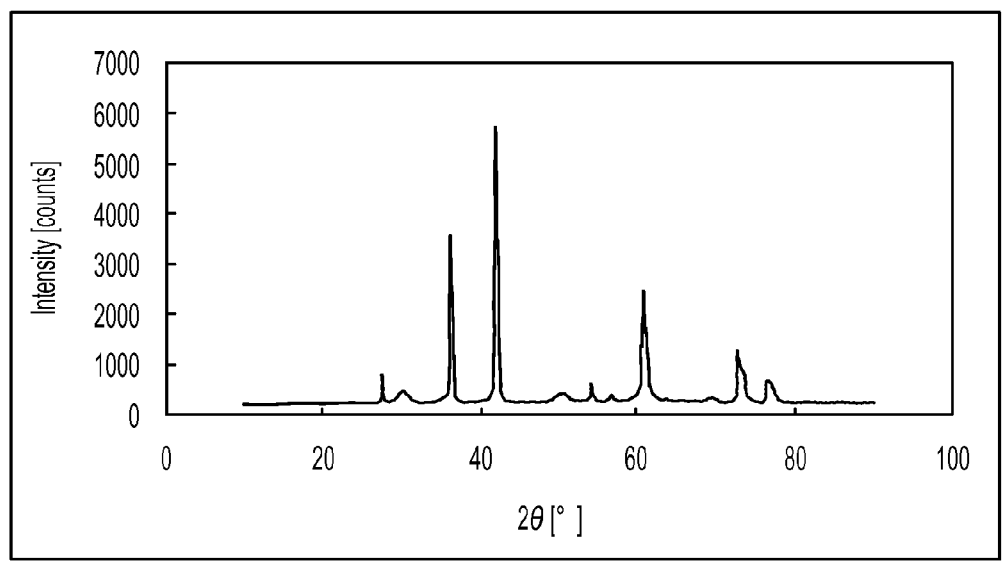
FIG. 8 is a powder X-ray diffraction spectrum of a catalyst (2) in Example 2.

The carbonitride (2) in an amount of 1.02 g was treated in the same manner as in Example 1 to give 1.11 g of an oxycarbonitride containing zirconium and titanium (hereinafter, also the catalyst (2)). The results of elemental analysis of the catalyst (2) are set forth in Table 1. A powder X-ray diffraction spectrum of the catalyst (2) is shown in FIG. 8.

2. Production of Fuel Cell Electrode

A fuel cell electrode (2) was produced in the same manner as in Example 1, except that the catalyst (2) was used.

3. Evaluation of Oxygen Reducing Ability

The fuel cell electrode (2) was evaluated for catalytic performance (oxygen reducing ability) as described in Example 1.

Figure 15:
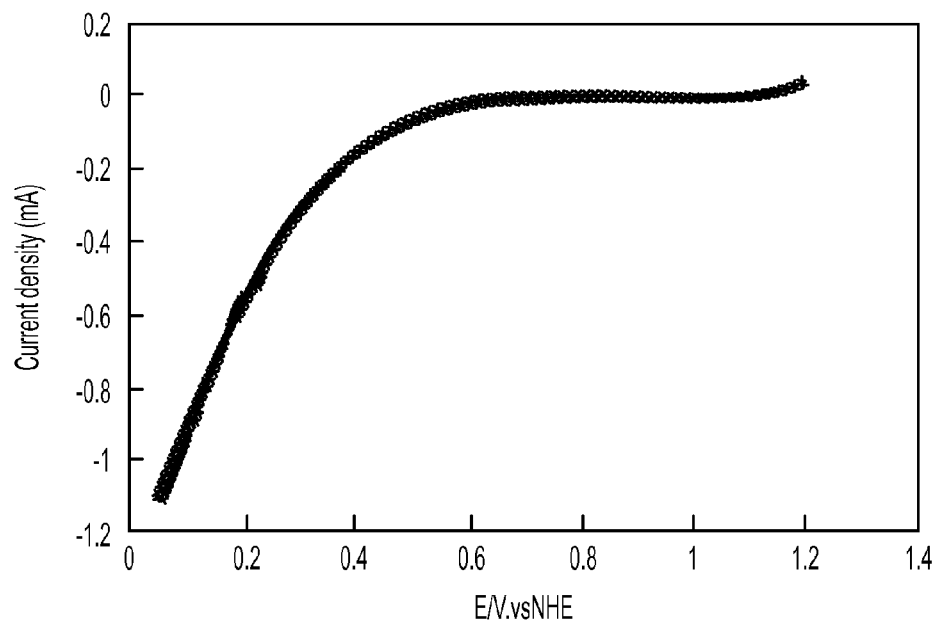
FIG. 15 is a graph showing an evaluation of the oxygen reducing ability of a fuel cell electrode (2) in Example 2.

The current-potential curve recorded during the measurement is shown in FIG. 15.

The fuel cell electrode (2) manufactured in Example 2 had an oxygen reduction onset potential of 0.80 V (vs. NHE), and was found to have high oxygen reducing ability.

Example 3

1. Preparation of Catalyst

Figure 3:
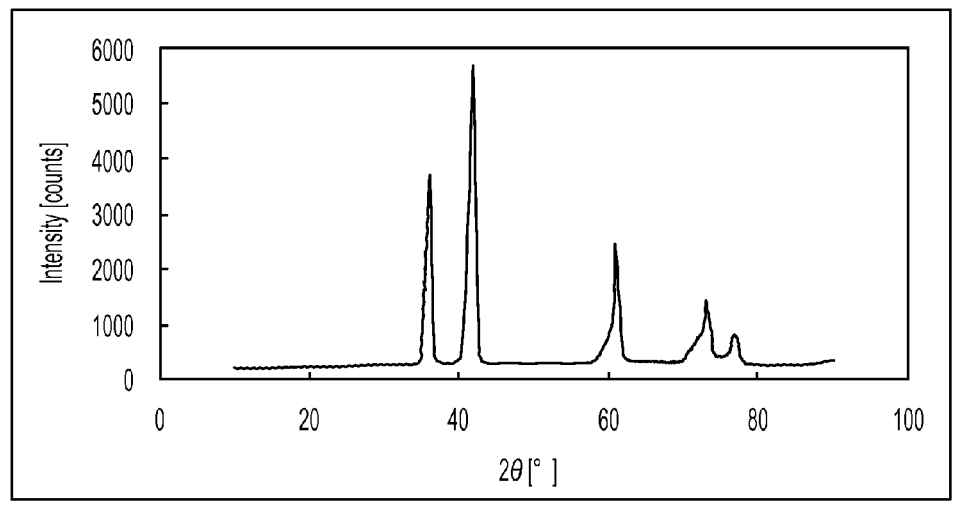
FIG. 3 is a powder X-ray diffraction spectrum of a carbonitride (3) used in Example 3.

Titanium carbide (TiC) weighing 2.70 g (45.0 mmol) and tantalum nitride (TaN) weighing 0.49 g (2.5 mmol) were mixed together sufficiently. The resultant mixture was heated in a nitrogen gas at 1800° C. for 3 hours to give 2.84 g of a carbonitride (3) containing tantalum and titanium. The sintered carbonitride (3) was crushed with a ball mill. FIG. 3 shows a powder X-ray diffraction spectrum of the carbonitride (3).

Figure 9:
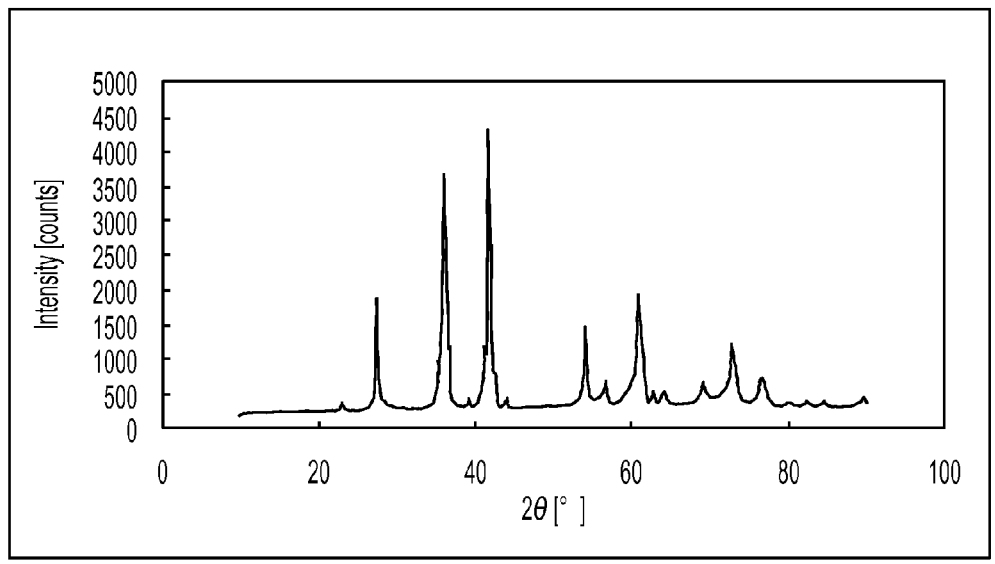
FIG. 9 is a powder X-ray diffraction spectrum of a catalyst (3) in Example 3.

The carbonitride (3) in an amount of 1.02 g was treated in the same manner as in Example 1 to give 1.11 g of an oxycarbonitride containing tantalum and titanium (hereinafter, also the catalyst (3)). The results of elemental analysis of the catalyst (3) are set forth in Table 1. A powder X-ray diffraction spectrum of the catalyst (3) is shown in FIG. 9.

2. Production of Fuel Cell Electrode

A fuel cell electrode (3) was produced in the same manner as in Example 1, except that the catalyst (3) was used.

3. Evaluation of Oxygen Reducing Ability

Figure 16:
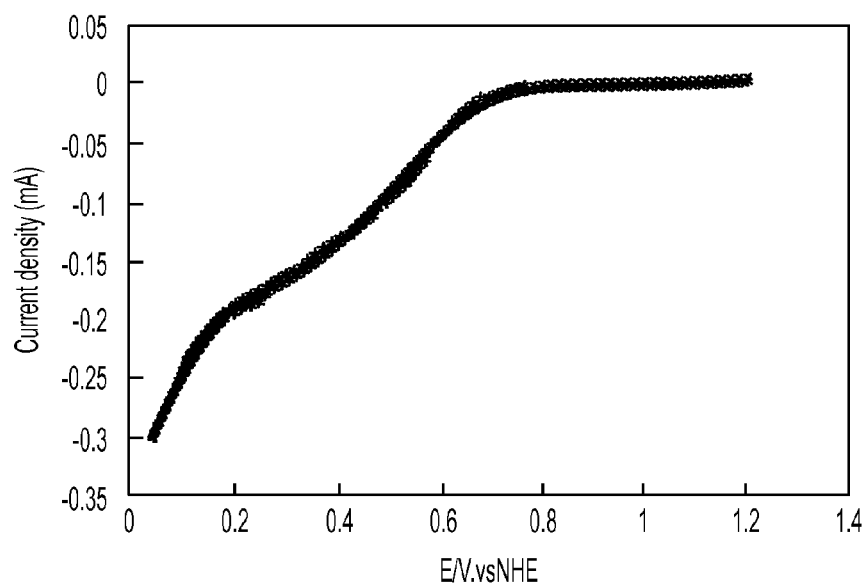
FIG. 16 is a graph showing an evaluation of the oxygen reducing ability of a fuel cell electrode (3) in Example 3.

The fuel cell electrode (3) was evaluated for catalytic performance (oxygen reducing ability) as described in Example 1. The current-potential curve recorded during the measurement is shown in FIG. 16.

The fuel cell electrode (3) manufactured in Example 3 had an oxygen reduction onset potential of 0.81 V (vs. NHE), and was found to have high oxygen reducing ability.

Example 4

1. Preparation of Catalyst

Figure 4:
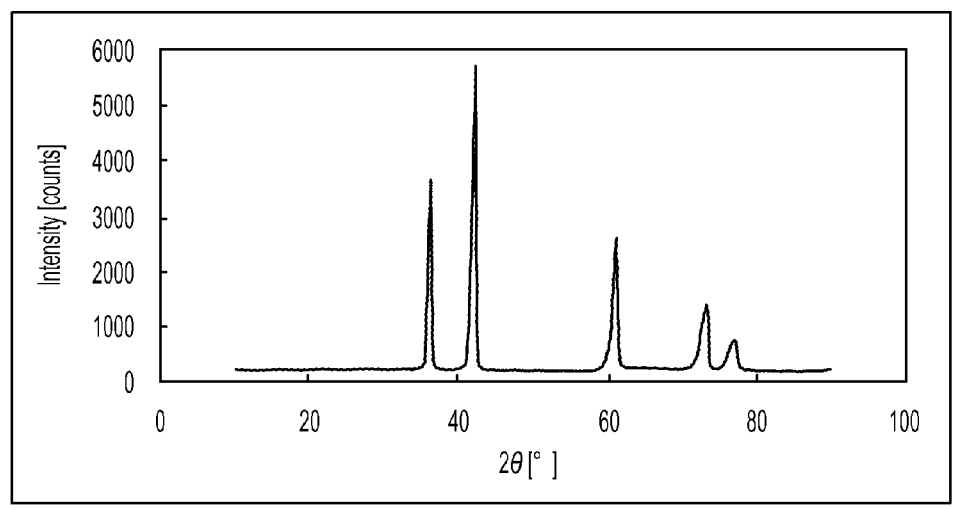
FIG. 4 is a powder X-ray diffraction spectrum of a carbonitride (4) used in Example 4.

Titanium carbide (TiC) weighing 2.55 g (42.5 mmol), titanium nitride (TiN) weighing 0.30 g (5.0 mmol) and aluminum oxide (Al$_2$O$_3$) weighing 0.13 g (1.25 mmol) were mixed together sufficiently. The resultant mixture was heated in a nitrogen gas at 1600° C. for 3 hours to give 2.72 g of a carbonitride (4) containing aluminum and titanium. The sintered carbonitride (4) was crushed with a ball mill. FIG. 4 shows a powder X-ray diffraction spectrum of the carbonitride (4).

Figure 10:
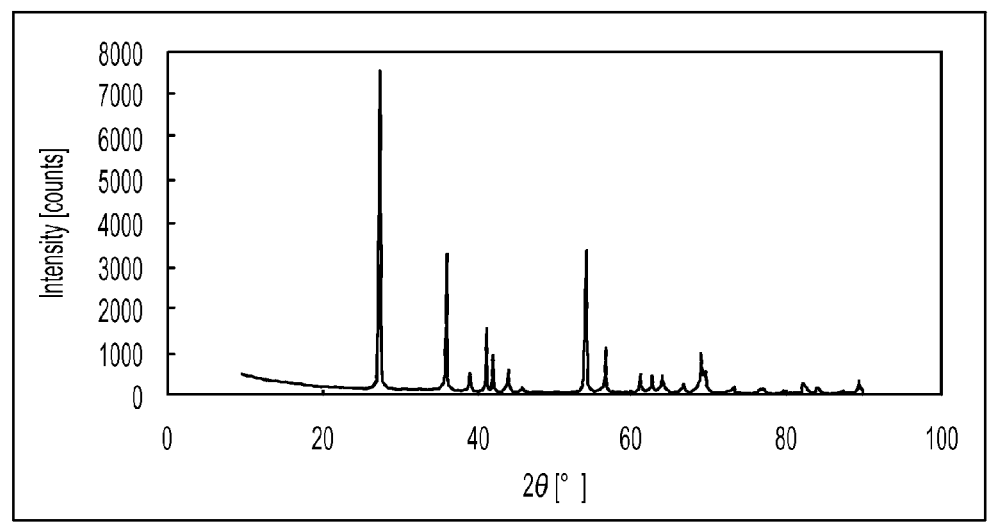
FIG. 10 is a powder X-ray diffraction spectrum of a catalyst (4) in Example 4.

The carbonitride (4) in an amount of 1.02 g was heated in a tubular furnace at 1000° C. for 1 hour while passing an argon gas containing 1% by volume of oxygen gas. As a result, 1.11 g of an oxycarbonitride containing aluminum and titanium (hereinafter, also the catalyst (4)) was obtained. The results of elemental analysis of the catalyst (4) are set forth in Table 1. A powder X-ray diffraction spectrum of the catalyst (4) is shown in FIG. 10.

2. Production of Fuel Cell Electrode

A fuel cell electrode (4) was produced in the same manner as in Example 1, except that the catalyst (4) was used.

3. Evaluation of Oxygen Reducing Ability

Figure 17:
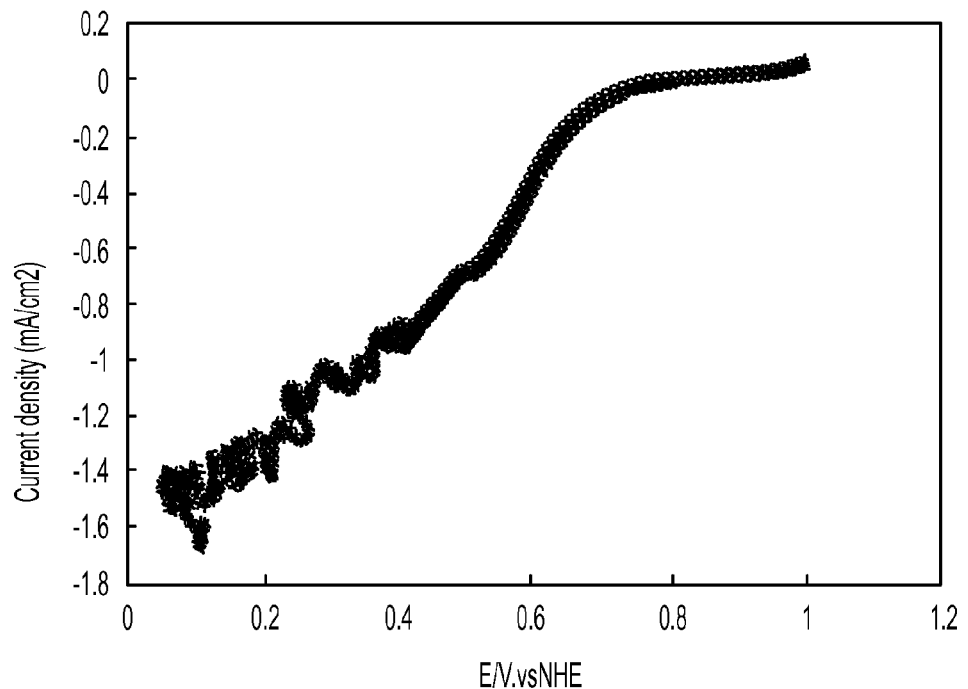
FIG. 17 is a graph showing an evaluation of the oxygen reducing ability of a fuel cell electrode (4) in Example 4.

The fuel cell electrode (4) was evaluated for catalytic performance (oxygen reducing ability) as described in Example 1. The current-potential curve recorded during the measurement is shown in FIG. 17.

The fuel cell electrode (4) manufactured in Example 4 had an oxygen reduction onset potential of 0.85 V (vs. NHE), and was found to have high oxygen reducing ability.

Example 5

1. Preparation of Catalyst

Figure 5:
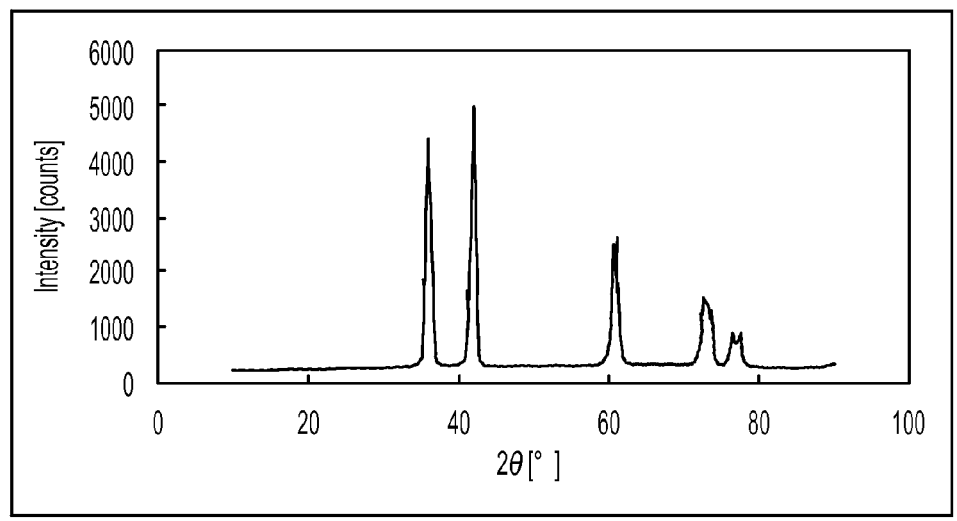
FIG. 5 is a powder X-ray diffraction spectrum of a carbonitride (5) used in Example 5.

Titanium carbide (TiC) weighing 4.46 g (42.5 mmol), tantalum oxide ($Ta_2O_5$) weighing 0.20 g (2.5 mmol) and titanium nitride (TiN) weighing 0.27 g (2.5 mmol) were mixed together sufficiently. The resultant mixture was heated in a nitrogen gas at 1600° C. for 3 hours to give 4.73 g of a carbonitride (5) containing tantalum and titanium. FIG. 5 shows a powder X-ray diffraction spectrum of the carbonitride (5). The sintered carbonitride (5) was crushed with a ball mill.

Figure 11:
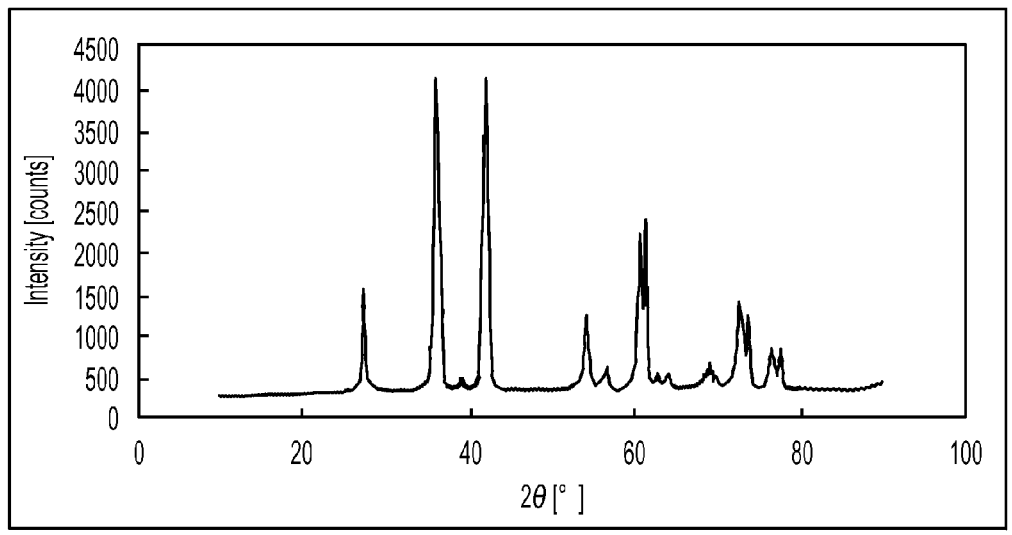
FIG. 11 is a powder X-ray diffraction spectrum of a catalyst (5) in Example 5.

The carbonitride (5) in an amount of 1.02 g was treated in the same manner as in Example 1 to give 1.11 g of an oxycarbonitride containing tantalum and titanium (hereinafter, also the catalyst (5)). The results of elemental analysis of the catalyst (5) are set forth in Table 1. A powder X-ray diffraction spectrum of the catalyst (5) is shown in FIG. 11.

2. Production of Fuel Cell Electrode

A fuel cell electrode (5) was produced in the same manner as in Example 1, except that the catalyst (5) was used.

3. Evaluation of Oxygen Reducing Ability

Figure 18:
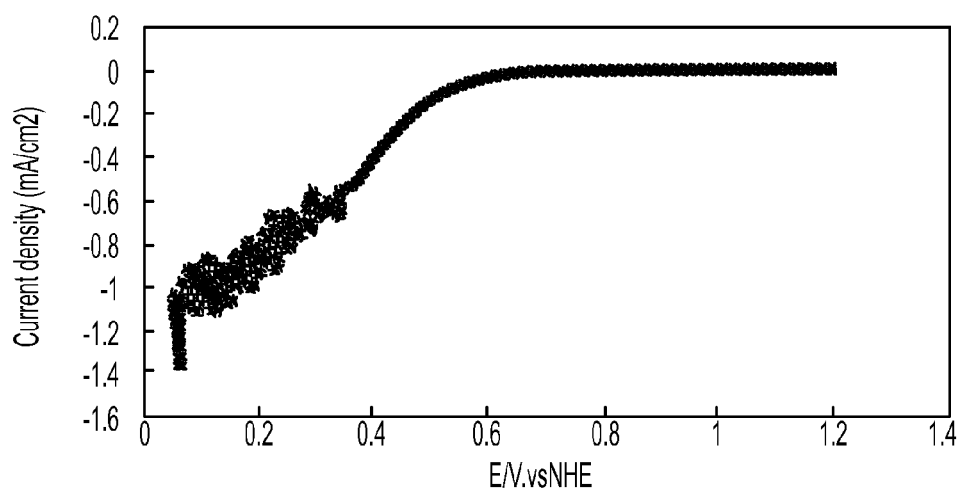
FIG. 18 is a graph showing an evaluation of the oxygen reducing ability of a fuel cell electrode (5) in Example 5.

The fuel cell electrode (5) was evaluated for catalytic performance (oxygen reducing ability) as described in Example 1. The current-potential curve recorded during the measurement is shown in FIG. 18.

The fuel cell electrode (5) manufactured in Example 5 had an oxygen reduction onset potential of 0.75 V (vs. NHE), and was found to have high oxygen reducing ability.

Example 6

1. Preparation of Catalyst

Figure 6:
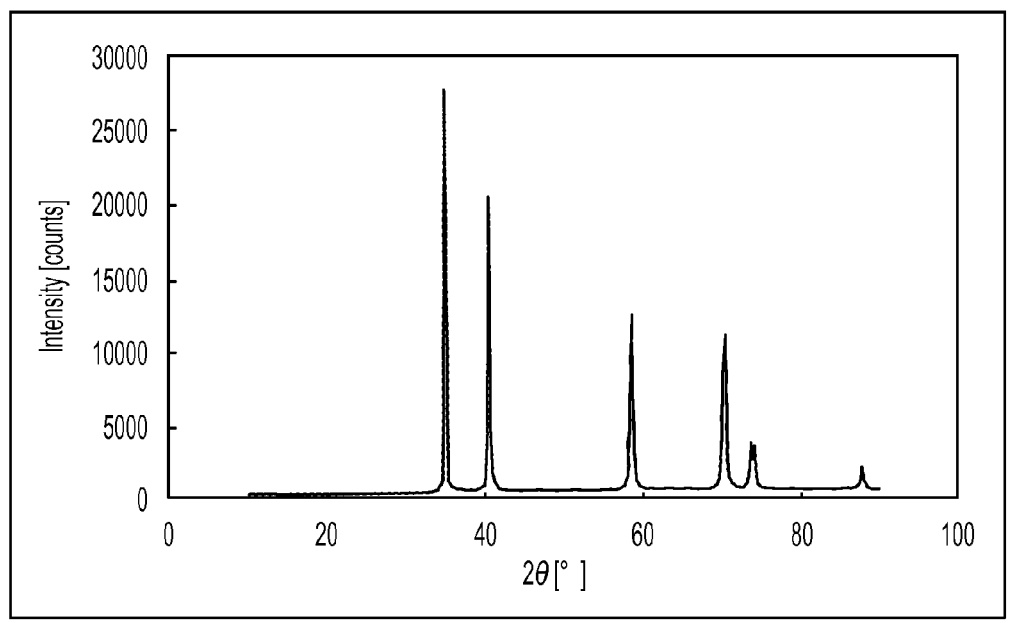
FIG. 6 is a powder X-ray diffraction spectrum of a carbonitride (6) used in Example 6.

Tantalum carbide (TaC) weighing 8.20 g (42.5 mmol), zirconium oxide ($ZrO_2$) weighing 0.62 g (5 mmol) and tantalum nitride (TaN) weighing 0.49 g (2.5 mmol) were mixed together sufficiently. The resultant mixture was heated in a nitrogen gas at 1800° C. for 3 hours to give 8.63 g of a carbonitride (6) containing tantalum and zirconium. FIG. 6 shows a powder X-ray diffraction spectrum of the carbonitride (6). The sintered carbonitride (6) was crushed with a ball mill.

Figure 12:
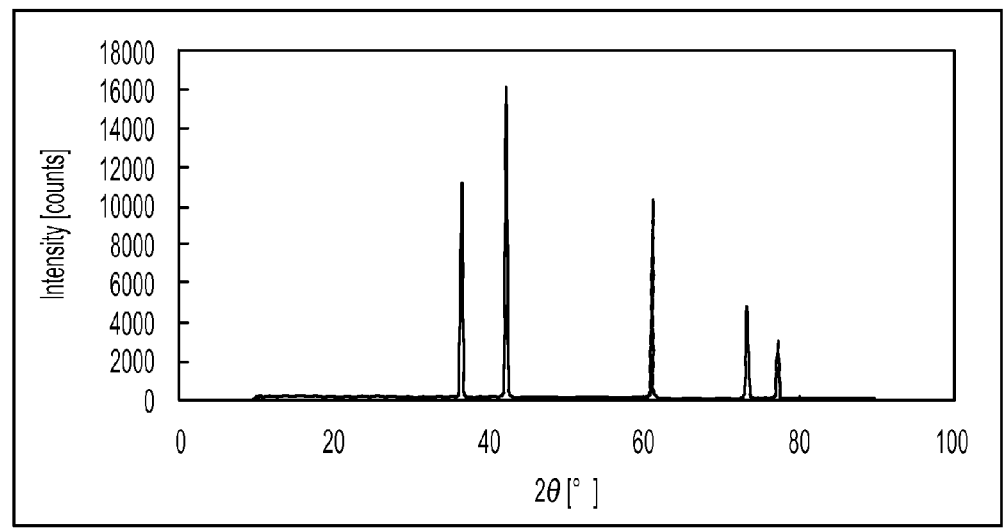
FIG. 12 is a powder X-ray diffraction spectrum of a catalyst (6) in Example 6.

The carbonitride (6) in an amount of 1.00 g was treated in the same manner as in Example 1 to give 1.11 g of an oxycarbonitride containing tantalum and zirconium (hereinafter, also the catalyst (6)). The results of elemental analysis of the catalyst (6) are set forth in Table 1. A powder X-ray diffraction spectrum of the catalyst (6) is shown in FIG. 12.

2. Production of Fuel Cell Electrode

A fuel cell electrode (6) was produced in the same manner as in Example 1, except that the catalyst (6) was used.

3. Evaluation of Oxygen Reducing Ability

Figure 19:
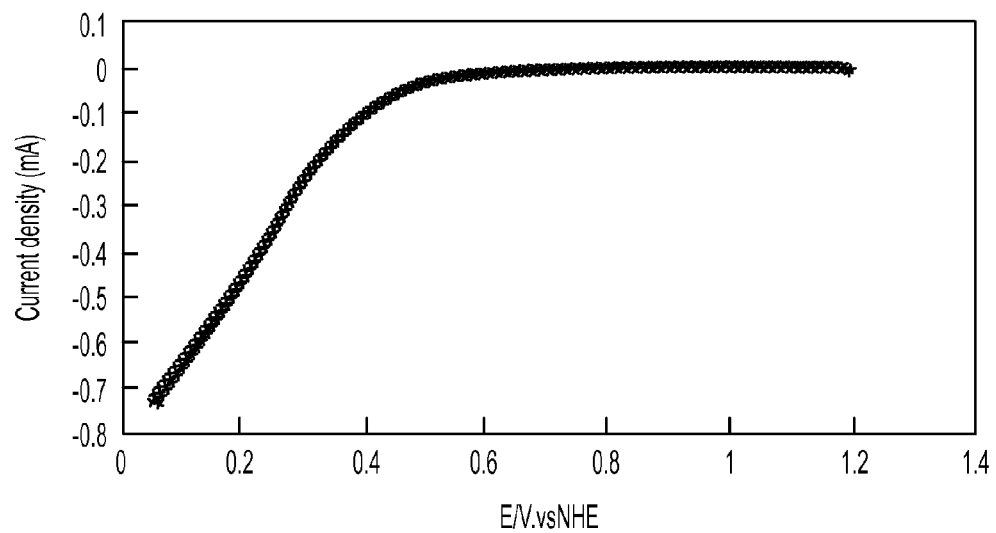
FIG. 19 is a graph showing an evaluation of the oxygen reducing ability of a fuel cell electrode (6) in Example 6.

The fuel cell electrode (6) was evaluated for catalytic performance (oxygen reducing ability) as described in Example 1. The current-potential curve recorded during the measurement is shown in FIG. 19.

The fuel cell electrode (6) manufactured in Example 6 had an oxygen reduction onset potential of 0.70 V (vs. NHE), and was found to have high oxygen reducing ability.

Comparative Example 1

1. Preparation of Catalyst

Figure 13:
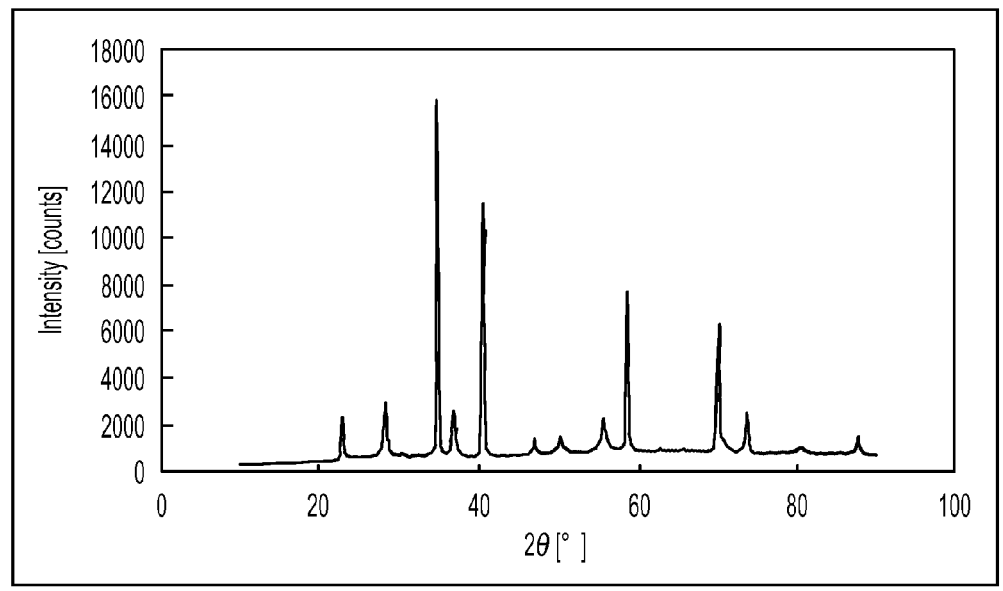
FIG. 13 is a powder X-ray diffraction spectrum of a catalyst (7) in Comparative Example 1.

Titanium carbide (TiC) weighing 4.85 g (81 mmol), titanium oxide ($TiO_2$) weighing 0.80 g (10 mmol) and titanium nitride (TiN) weighing 0.31 g (5 mmol) were mixed together sufficiently. The resultant mixture was heated in a nitrogen gas at 1600° C. for 3 hours to give 5.73 g of a sintered titanium carbonitride (hereinafter, also the catalyst (7)). Because the carbonitride had been sintered, it was crushed with a ball mill. The results of elemental analysis of the crushed catalyst (7) are set forth in Table 1. A powder X-ray diffraction spectrum of the catalyst (7) is shown in FIG. 13.

2. Production of Fuel Cell Electrode

A fuel cell electrode (7) was produced in the same manner as in Example 1, except that the titanium carbonitride was used.

3. Evaluation of Oxygen Reducing Ability

Figure 20:
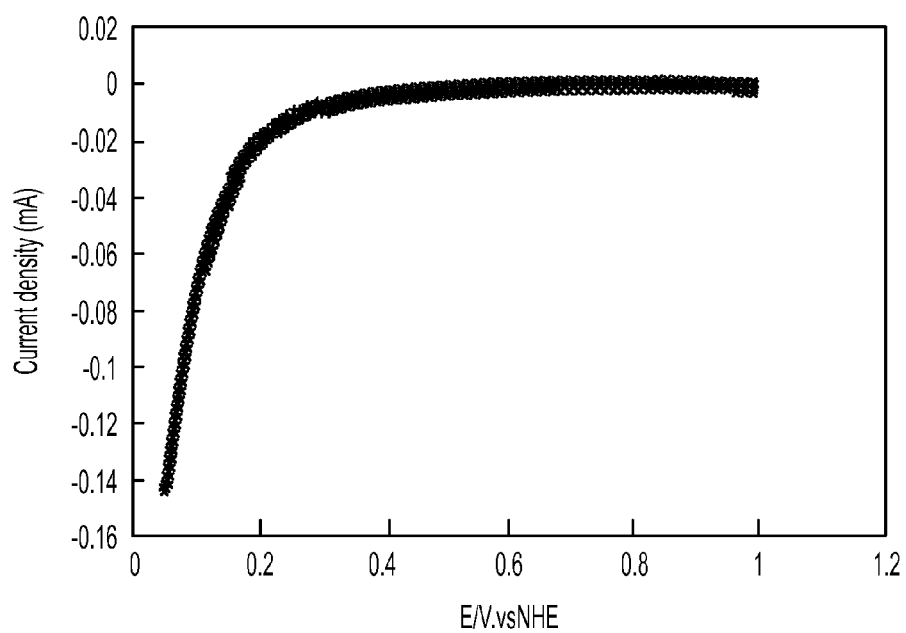
FIG. 20 is a graph showing an evaluation of the oxygen reducing ability of a fuel cell electrode (7) in Comparative Example 1.

The fuel cell electrode (7) was evaluated for catalytic performance (oxygen reducing ability) as described in Example 1. The current-potential curve recorded during the measurement is shown in FIG. 20.

The fuel cell electrode (7) manufactured in Comparative Example 1 had an oxygen reduction onset potential of 0.45 V (vs. NHE), and was found to have low oxygen reducing ability.

Example 7

1. Preparation of Catalyst

Molybdenum trioxide ($MoO_3$) weighing 0.72 g (5 mmol), titanium oxide ($TiO_2$) weighing 7.6 g (95 mmol) and carbon (Vulcan 72 manufactured by Cabot Corporation) weighing 3 g (250 mmol) were mixed together sufficiently. The resultant mixture was heated in a nitrogen gas at 1700° C. for 3 hours to give 6.13 g of a carbonitride (8) containing molybdenum and titanium. The sintered carbonitride (8) was crushed with a ball mill.

The carbonitride (8) in an amount of 1.02 g was heated in a tubular furnace at 1000° C. for 1 hour while passing an argon gas containing 1% by volume of oxygen gas. As a result, 1.13 g of an oxycarbonitride containing aluminum and titanium (hereinafter, also the catalyst (8)) was obtained.

Figure 21:
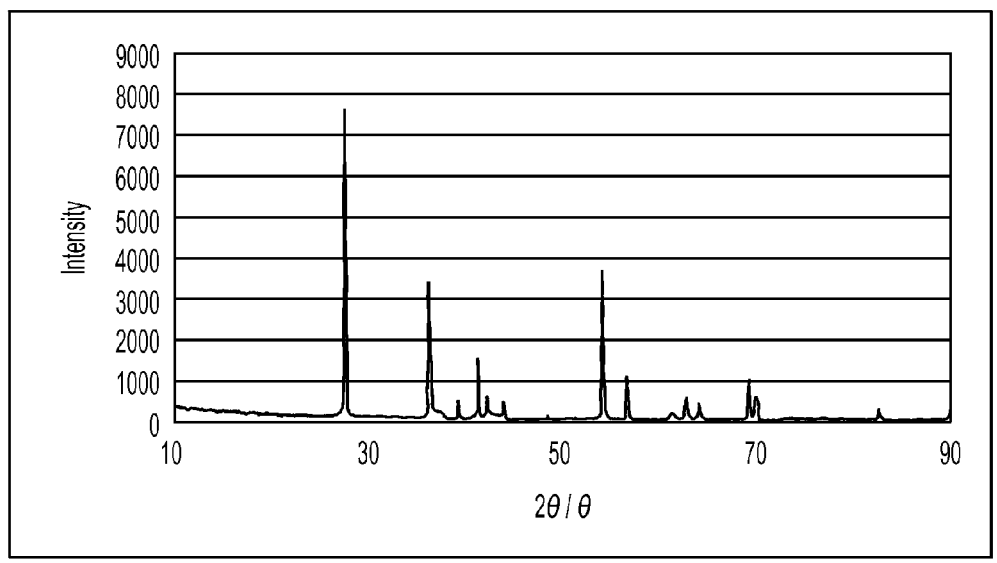
FIG. 21 is a powder X-ray diffraction spectrum of a catalyst (8) in Example 7.

The results of elemental analysis of the catalyst (8) are set forth in Table 1. A powder X-ray diffraction spectrum of the catalyst (8) is shown in FIG. 21.

2. Production of Fuel Cell Electrode

A fuel cell electrode (8) was produced in the same manner as in Example 1, except that the catalyst (8) was used.

3. Evaluation of Oxygen Reducing Ability

Figure 22:
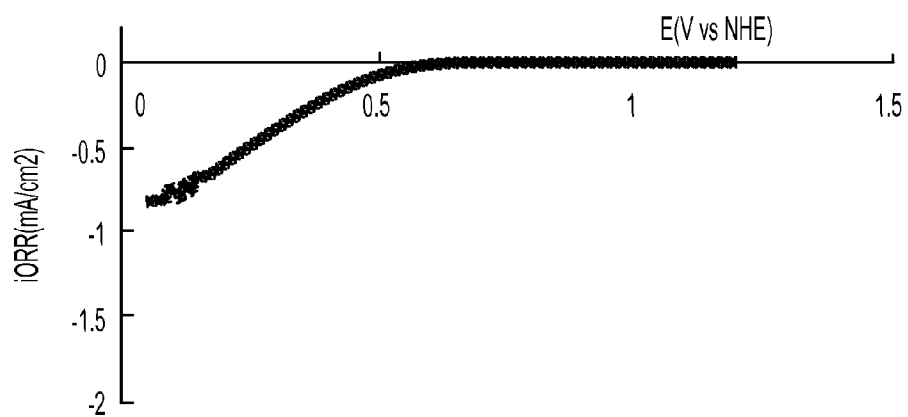
FIG. 22 is a graph showing an evaluation of the oxygen reducing ability of a fuel cell electrode (8) in Example 7.

The fuel cell electrode (8) was evaluated for catalytic performance (oxygen reducing ability) as described in Example 1. The current-potential curve recorded during the measurement is shown in FIG. 22.

The fuel cell electrode (8) manufactured in Example 7 had an oxygen reduction onset potential of 0.75 V (vs. NHE), and was found to have high oxygen reducing ability.

Example 8

1. Preparation of Catalyst

Tungsten trioxide ($WO_3$) weighing 1.16 g (5 mmol), titanium oxide ($TiO_2$) weighing 7.6 g (95 mmol) and carbon (Vulcan 72 manufactured by Cabot Corporation) weighing 3 g (250 mmol) were mixed together sufficiently. The resultant mixture was heated in a nitrogen gas at 1700° C. for 3 hours to give 6.51 g of a carbonitride containing tungsten and titanium. The sintered carbonitride (9) was crushed with a ball mill.

Figure 23:
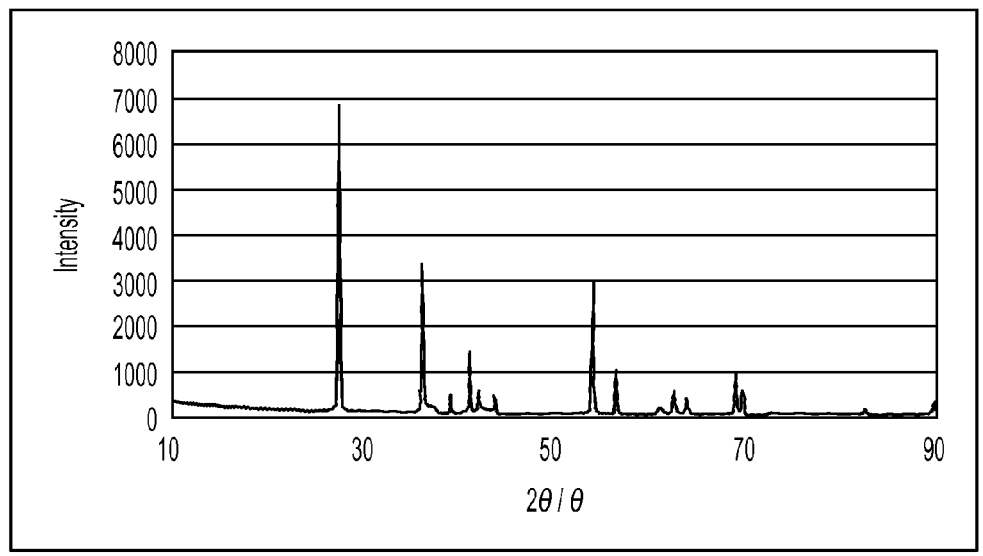
FIG. 23 is a powder X-ray diffraction spectrum of a catalyst (9) in Example 8.

The carbonitride (9) in an amount of 1.02 g was heated in a tubular furnace at 1000° C. for 1 hour while passing an argon gas containing 1% by volume of oxygen gas. As a result, 1.17 g of an oxycarbonitride containing aluminum and titanium (hereinafter, also the catalyst (9)) was obtained. The results of elemental analysis of the catalyst (9) are set forth in Table 1. A powder X-ray diffraction spectrum of the catalyst (9) is shown in FIG. 23.

2. Production of Fuel Cell Electrode

A fuel cell electrode (9) was produced in the same manner as in Example 1, except that the catalyst (9) was used.

3. Evaluation of Oxygen Reducing Ability

Figure 24:
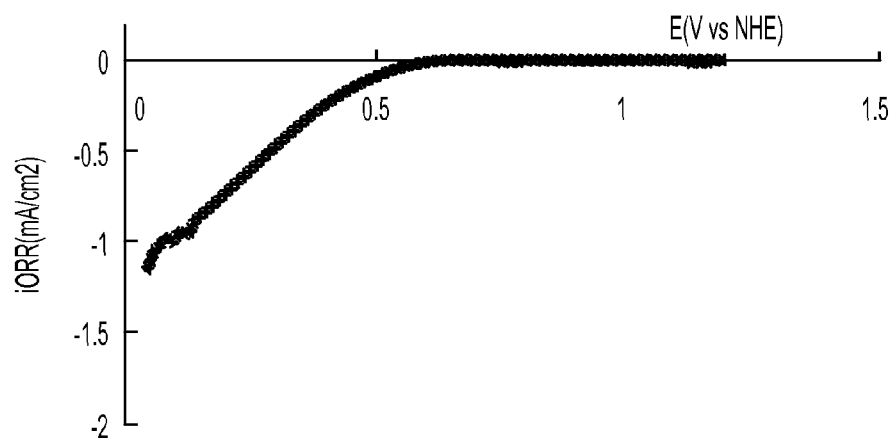
FIG. 24 is a graph showing an evaluation of the oxygen reducing ability of a fuel cell electrode (9) in Example 8.

The fuel cell electrode (9) was evaluated for catalytic performance (oxygen reducing ability) as described in Example 1. The current-potential curve recorded during the measurement is shown in FIG. 24.

The fuel cell electrode (9) manufactured in Example 8 had an oxygen reduction onset potential of 0.69 V (vs. NHE), and was found to have high oxygen reducing ability.

Example 9

1. Preparation of Catalyst

Anhydrous iron acetate (($CH_3CO_2$)$_2$Fe) weighing 0.6545 g (5 mmol), titanium oxide ($TiO_2$) weighing 7.6 g (95 mmol) and carbon (Vulcan 72 manufactured by Cabot Corporation) weighing 3 g (250 mmol) were mixed together sufficiently. The resultant mixture was heated in a nitrogen gas at 1700° C. for 3 hours to give 5.96 g of a carbonitride containing tungsten and titanium. The sintered carbonitride (10) was crushed with a ball mill.

Figure 25:
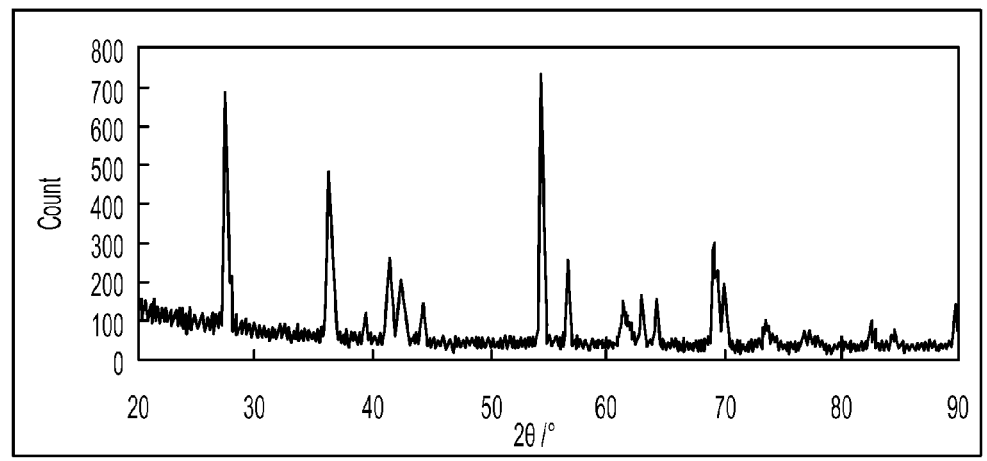
FIG. 25 is a powder X-ray diffraction spectrum of a catalyst (10) in Example 9.

The carbonitride (10) in an amount of 1.00 g was heated in a tubular furnace at 1000° C. for 1 hour while passing an argon gas containing 1% by volume of oxygen gas. As a result, 1.15 g of an oxycarbonitride containing iron and titanium (hereinafter, also the catalyst (10)) was obtained. The results of elemental analysis of the catalyst (10) are set forth in Table 1. A powder X-ray diffraction spectrum of the catalyst (10) is shown in FIG. 25.

2. Production of Fuel Cell Electrode

A fuel cell electrode (10) was produced in the same manner as in Example 1, except that the catalyst (10) was used.

3. Evaluation of Oxygen Reducing Ability

Figure 26:
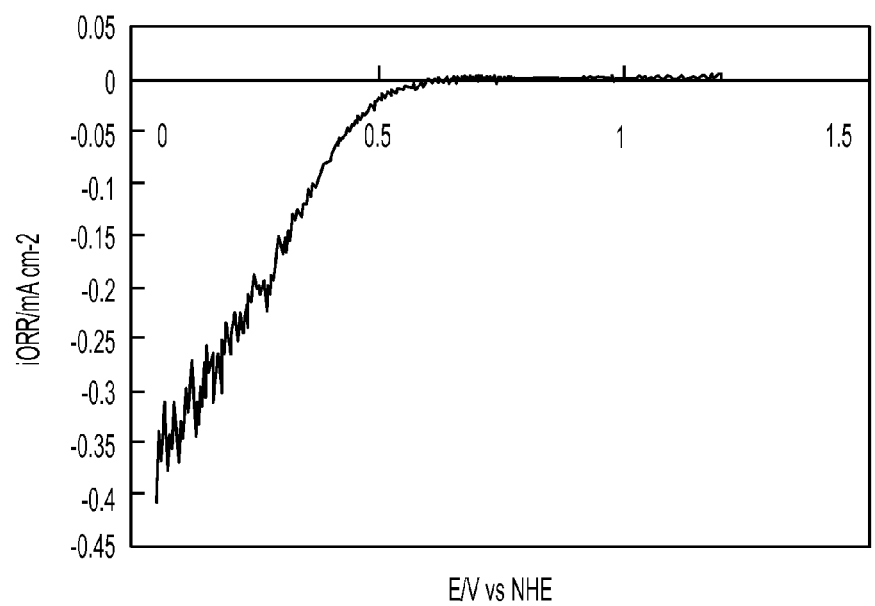
FIG. 26 is a graph showing an evaluation of the oxygen reducing ability of a fuel cell electrode (10) in Example 9.

The fuel cell electrode (10) was evaluated for catalytic performance (oxygen reducing ability) as described in Example 1. The current-potential curve recorded during the measurement is shown in FIG. 26.

The fuel cell electrode (10) manufactured in Example 9 had an oxygen reduction onset potential of 0.70 V (vs. NHE), and was found to have high oxygen reducing ability.

Example 10

1. Preparation of Catalyst

Figure 27:
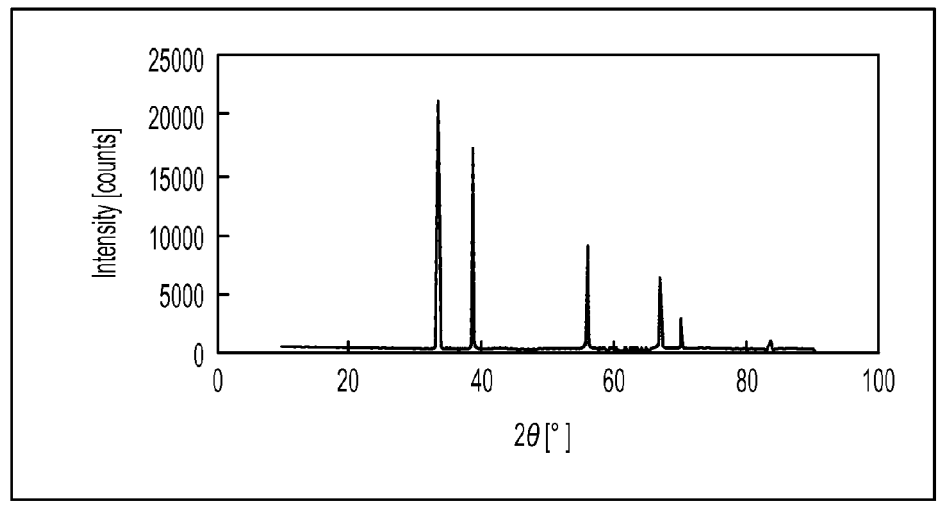
FIG. 27 is a powder X-ray diffraction spectrum of a carbonitride (11) in Example 10.

Zirconium carbide (ZrC) weighing 8.20 g (42.5 mmol), zirconium oxide ($ZrO_2$) weighing 0.62 g (5 mmol) and zirconium nitride (ZrN) weighing 0.49 g (2.5 mmol) were mixed together sufficiently. The resultant mixture was heated in a nitrogen gas at 1800° C. for 3 hours to give 8.63 g of a carbonitride containing zirconium. Distilled water in a volume of 20 ml was added to 2.08 g (20 mmol) of the carbonitride. While the resultant mixture was ultrasonically suspended, 42 mg (1 mmol) of iron nitrate was added and dissolved therein. Subsequently, water was removed at a low temperature. As a result, 2.48 g of a carbonitride (11) containing iron and zirconium was obtained. A powder X-ray diffraction spectrum of the carbonitride (11) is shown in FIG. 27. The sintered carbonitride (11) was crushed with a ball mill.

Figure 28:
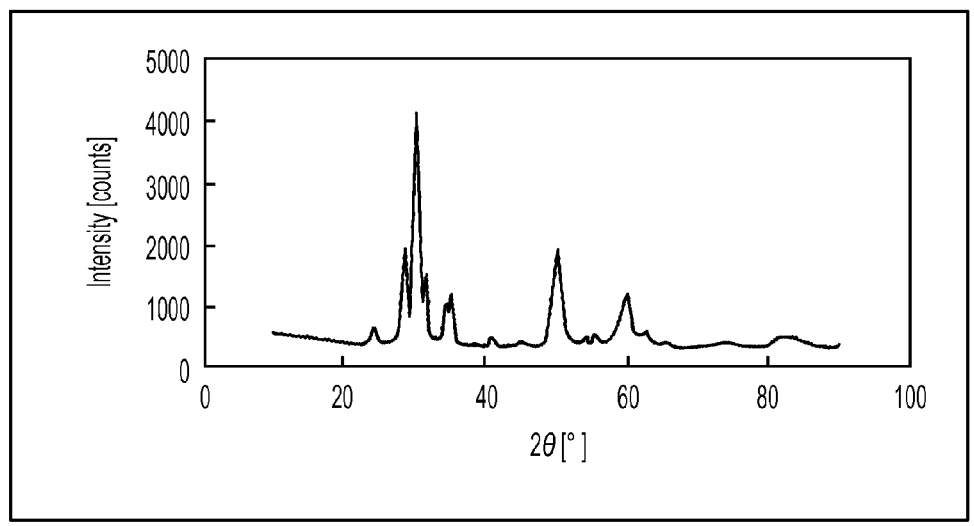
FIG. 28 is a powder X-ray diffraction spectrum of a catalyst (11) in Example 10.

The carbonitride (11) in an amount of 1.08 g was heated at 900° C. for 12 hours while passing a nitrogen gas containing 1% by volume of oxygen gas and 2% by volume of hydrogen gas. As a result, 1.32 g of an oxycarbonitride containing iron and zirconium (hereinafter, also the catalyst (11)) was obtained. The results of elemental analysis of the catalyst (11) are set forth in Table 1. A powder X-ray diffraction spectrum of the catalyst (11) is shown in FIG. 28.

2. Production of Fuel Cell Electrode

A fuel cell electrode (11) was produced in the same manner as in Example 1, except that the catalyst (11) was used.

3. Evaluation of Oxygen Reducing Ability

Figure 29:
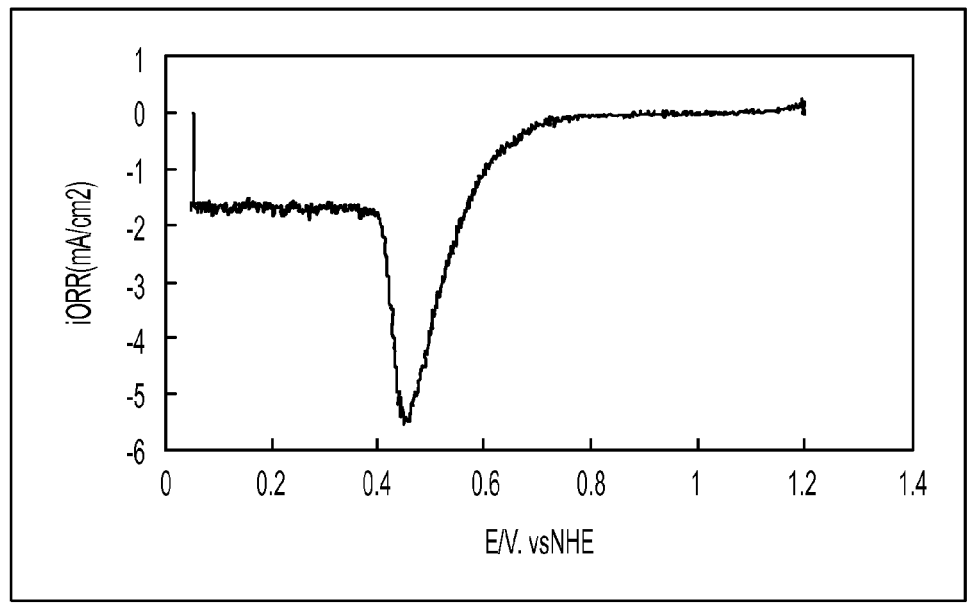
FIG. 29 is a graph showing an evaluation of the oxygen reducing ability of a fuel cell electrode (11) in Example 10.

The fuel cell electrode (11) was evaluated for catalytic performance (oxygen reducing ability) as described in Example 1. The current-potential curve recorded during the measurement is shown in FIG. 29.

The fuel cell electrode (11) manufactured in Example 10 had an oxygen reduction onset potential of 0.95 V (vs. NHE), and was found to have high oxygen reducing ability.

Example 11

1. Preparation of Catalyst

Cerium oxide ($CeO_2$) weighing 0.26 g (1.6 mmol), titanium oxide ($TiO_2$) weighing 7.6 g (95 mmol) and carbon (Vulcan 72 manufactured by Cabot Corporation) weighing 3 g (250 mmol) were mixed together sufficiently. The resultant mixture was heated in a nitrogen gas at 1700° C. for 3 hours to give 6.03 g of a carbonitride (12) containing cerium and titanium. The sintered carbonitride (12) was crushed with a ball mill.

Figure 30:
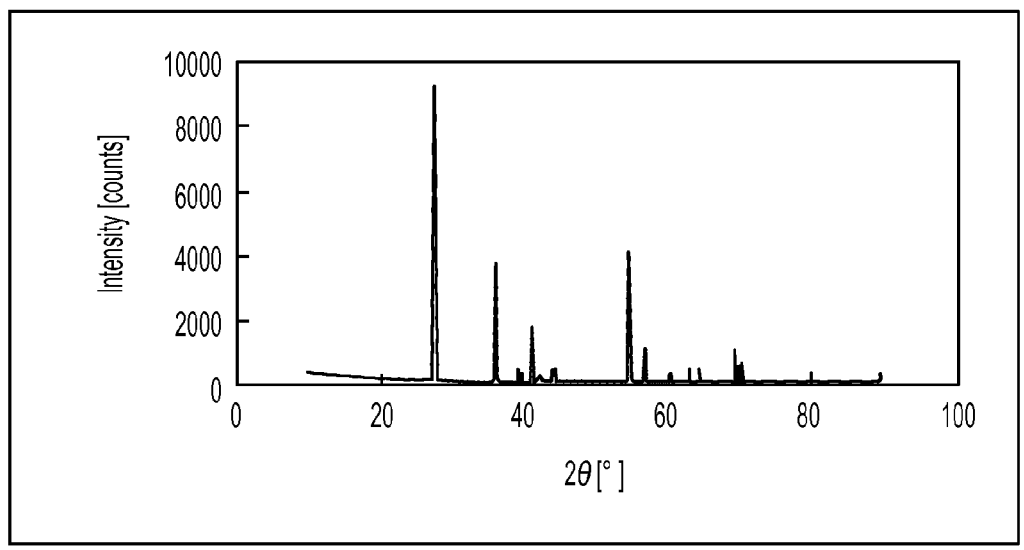
FIG. 30 is a powder X-ray diffraction spectrum of a catalyst (12) in Example 11.

The carbonitride (12) in an amount of 1.08 g was heated at 1000° C. for 8 hours while passing a nitrogen gas containing 2% by volume of oxygen gas and 4% by volume of hydrogen gas. As a result, 1.32 g of an oxycarbonitride containing cerium and titanium (hereinafter, also the catalyst (12)) was obtained. The results of elemental analysis of the catalyst (12) are set forth in Table 1. A powder X-ray diffraction spectrum of the catalyst (12) is shown in FIG. 30.

2. Production of Fuel Cell Electrode

A fuel cell electrode (12) was produced in the same manner as in Example 1, except that the catalyst (12) was used.

3. Evaluation of Oxygen Reducing Ability

Figure 31:
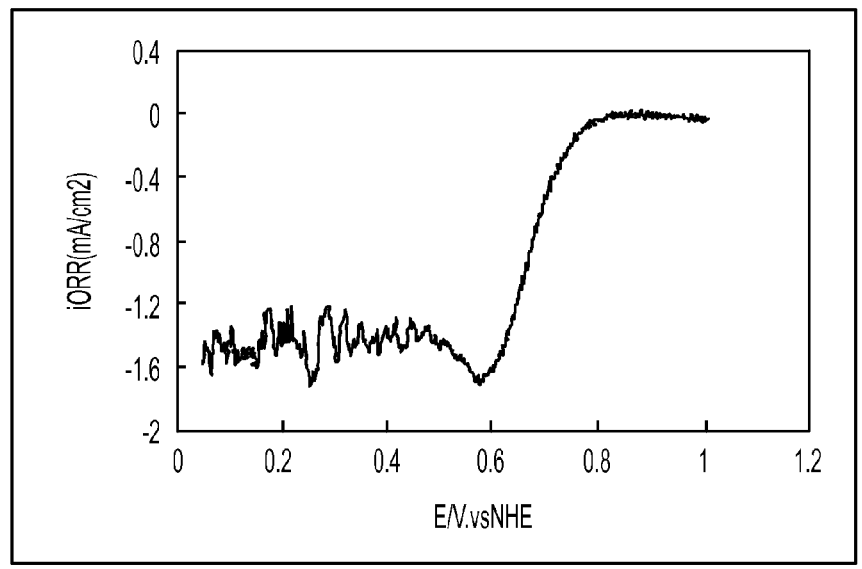
FIG. 31 is a graph showing an evaluation of the oxygen reducing ability of a fuel cell electrode (12) in Example 11.

The fuel cell electrode (12) was evaluated for catalytic performance (oxygen reducing ability) as described in Example 1. The current-potential curve recorded during the measurement is shown in FIG. 31.

The fuel cell electrode (12) manufactured in Example 11 had an oxygen reduction onset potential of 0.85 V (vs. NHE), and was found to have high oxygen reducing ability.

Example 12

1. Preparation of Catalyst

Figure 32:
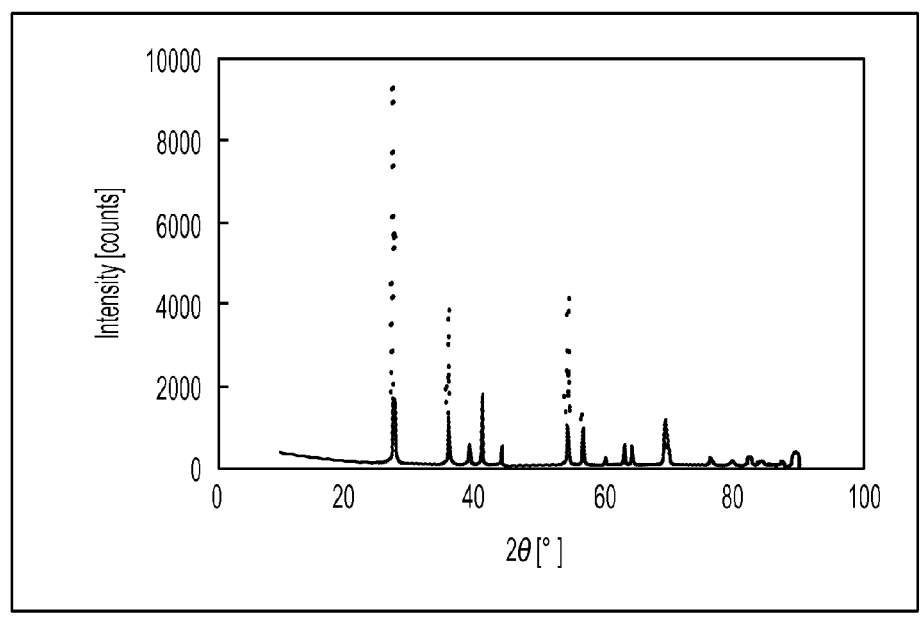
FIG. 32 is a powder X-ray diffraction spectrum of a catalyst (13) in Example 12.

A carbonitride (13) weighing 1.00 g which was the carbonitride from Example 9 containing iron and titanium and crushed with a ball mill, was heated at 1000° C. for 8 hours while passing a nitrogen gas containing 2% by volume of oxygen gas and 4% by volume of hydrogen gas. As a result, 1.30 g of an oxycarbonitride containing iron and titanium (hereinafter, also the catalyst (13)) was obtained. The results of elemental analysis of the catalyst (13) are set forth in Table 1. A powder X-ray diffraction spectrum of the catalyst (13) is shown in FIG. 32.

2. Production of Fuel Cell Electrode

A fuel cell electrode (13) was produced in the same manner as in Example 1, except that the catalyst (13) was used.

3. Evaluation of Oxygen Reducing Ability

Figure 33:
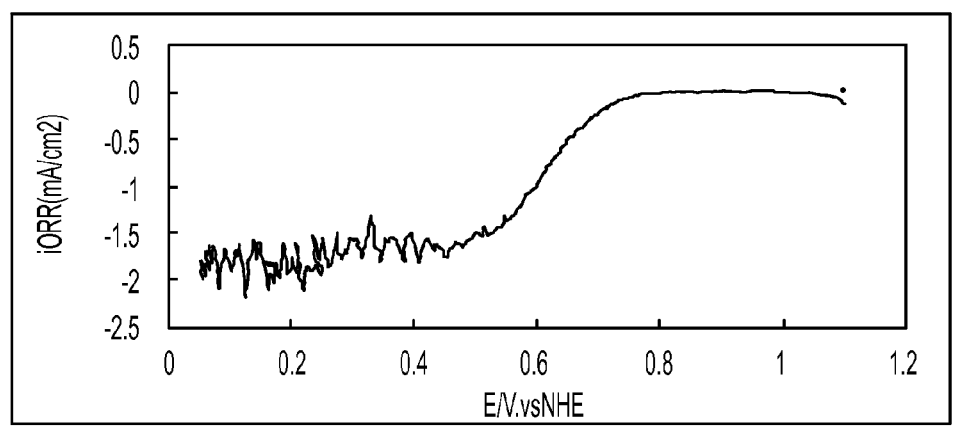
FIG. 33 is a graph showing an evaluation of the oxygen reducing ability of a fuel cell electrode (13) in Example 12.

The fuel cell electrode (13) was evaluated for catalytic performance (oxygen reducing ability) as described in Example 1. The current-potential curve recorded during the measurement is shown in FIG. 33.

The fuel cell electrode (13) manufactured in Example 12 had an oxygen reduction onset potential of 0.90 V (vs. NHE), and was found to have high oxygen reducing ability.

TABLE 1

Elemental analysis results of catalysts (% by mass (The numbers in parentheses indicate the ratio of the numbers of the atoms.))

| | Ti | Zr | Metal | C | N | O | Compositional formula |
|---|---|---|---|---|---|---|---|
| Ex. 1 | 59.3 (0.91) | 11.2 (0.09) | | 8.0 (0.49) | 5.9 (0.31) | 15.4 (0.71) | $Ti_{0.91}Zr_{0.09}C_{0.49}N_{0.31}O_{0.71}$ |
| Ex. 2 | 59.1 (0.90) | 12.5 (0.10) | | 7.4 (0.45) | 6.1 (0.33) | 14.7 (0.67) | $Ti_{0.90}Zr_{0.10}C_{0.45}N_{0.33}O_{0.67}$ |
| Ex. 3 | 51.7 (0.90) | | (Ta) 21.7 (0.10) | 7.3 (0.51) | 5.0 (0.30) | 14.0 (0.73) | $Ti_{0.90}Ta_{0.10}C_{0.51}N_{0.30}O_{0.73}$ |
| Ex. 4 | 59.7 (0.95) | | (Al) 1.8 (0.05) | 2.0 (0.13) | 0.6 (0.03) | 36.0 (1.72) | $Ti_{0.95}Al_{0.05}C_{0.13}N_{0.03}O_{1.72}$ |
| Ex. 5 | 52.3 (0.91) | | (Ta) 19.6 (0.09) | 7.2 (0.50) | 5.5 (0.33) | 15.6 (0.81) | $Ti_{0.91}Ta_{0.09}C_{0.50}N_{0.33}O_{0.81}$ |
| Ex. 6 | | 4.6 (0.10) | (Ta) 79.6 (0.90) | 3.0 (0.52) | 1.4 (0.24) | 11.00 (1.40) | $Zr_{0.10}Ta_{0.90}C_{0.52}N_{0.24}O_{1.40}$ |
| Ex. 7 | 52.21 (0.95) | | (Mo) 5.51 (0.05) | 11.48 (0.83) | 1.12 (0.07) | 29.68 (1.62) | $Ti_{0.95}Mo_{0.05}C_{0.83}N_{0.07}O_{1.62}$ |
| Ex. 8 | 52.61 (0.95) | | (W) 10.63 (0.05) | 2.81 (0.20) | 0.34 (0.02) | 33.61 (1.82) | $Ti_{0.95}W_{0.05}C_{0.20}N_{0.02}O_{1.82}$ |
| Ex. 9 | 58.13 (0.95) | | (Fe) 2.87 (0.05) | 2.61 (0.17) | 0.89 (0.05) | 34.8 (1.70) | $Ti_{0.95}Fe_{0.05}C_{0.17}N_{0.05}O_{1.70}$ |
| Ex. 10 | | 71.29 (0.95) | (Fe) 2.3 (0.05) | 3.16 (0.32) | 0.69 (0.06) | 22.56 (1.71) | $Zr_{0.95}Fe_{0.05}C_{0.32}N_{0.06}O_{1.71}$ |
| Ex. 11 | 54.21 (0.95) | | (Ce) 8.35 (0.05) | 2.23 (0.16) | 0.67 (0.04) | 34.54 (1.81) | $Ti_{0.95}Ce_{0.05}C_{0.16}N_{0.04}O_{1.81}$ |
| Ex. 12 | 57.7 (0.95) | | (Fe) 3.54 (0.05) | 2.37 (0.16) | 0.72 (0.04) | 35.67 (1.76) | $Ti_{0.95}Fe_{0.05}C_{0.16}N_{0.04}O_{1.76}$ |
| Comp. Ex. 1 | 77.5 (1) | | | 10.0 (0.51) | 12.0 (0.53) | 0.5 (0.02) | $TiC_{0.51}N_{0.53}O_{0.02}$ |

INDUSTRIAL APPLICABILITY

The catalysts of the present invention are not corroded in acidic electrolytes or at high potential and have excellent durability and high oxygen reducing ability. They are therefore suitably used in fuel cell catalyst layers, electrodes, membrane electrode assemblies and fuel cells.

The invention claimed is:

1. A process for producing a catalyst comprising a metal oxycarbonitride, the process comprising a step (X) of heating a metal carbonitride in an oxygen-containing inert gas to produce a catalyst comprising a metal oxycarbonitride, the metal carbonitride containing two metals M selected from the group consisting of tin, indium, platinum, tantalum, zirconium, titanium, copper, iron, tungsten, chromium, molybdenum, hafnium, vanadium, cobalt, cerium, aluminum and nickel, and wherein at least one of the two metals M is zirconium or titanium.

2. The process according to claim 1, which further comprises a step of producing the metal carbonitride by any of steps (a) to (n) below:
   (a) a step in which a mixture comprising a metal M-containing compound except a zirconium-containing compound and a zirconium-containing compound, wherein at least one of the metal M-containing compound and the zirconium-containing compound is a carbide, is heated in a nitrogen gas or an inert gas containing nitrogen to give a metal carbonitride;
   (b) a step in which a mixture comprising a metal M-containing compound except a titanium-containing compound and a titanium-containing compound, wherein at least one of the metal M-containing compound and the titanium-containing compound is a carbide, is heated in a nitrogen gas or an inert gas containing nitrogen to give a metal carbonitride;
   (c) a step in which a mixture comprising a metal M oxide except zirconium oxide, zirconium oxide and carbon is heated in a nitrogen gas or an inert gas containing nitrogen to give a metal carbonitride;
   (d) a step in which a mixture comprising a metal M oxide except titanium oxide, titanium oxide and carbon is heated in a nitrogen gas or an inert gas containing nitrogen to give a metal carbonitride;
   (e) a step in which a mixture comprising a metal M oxide except zirconium oxide, zirconium carbide and zirconium nitride is heated in a nitrogen gas or an inert gas containing nitrogen to give a metal carbonitride;
   (f) a step in which a mixture comprising a metal M oxide except titanium oxide, titanium carbide and titanium nitride is heated in a nitrogen gas or an inert gas containing nitrogen to give a metal carbonitride;
   (g) a step in which a mixture comprising a metal M oxide except zirconium oxide, zirconium carbide, zirconium nitride and zirconium oxide is heated in a nitrogen gas or an inert gas containing nitrogen to give a metal carbonitride;
   (h) a step in which a mixture comprising a metal M oxide except titanium oxide, titanium carbide, titanium nitride and titanium oxide is heated in a nitrogen gas or an inert gas containing nitrogen to give a metal carbonitride;
   (i) a step in which a mixture comprising a metal M carbide except zirconium carbide, a metal M nitride except zirconium nitride and zirconium oxide is heated in a nitrogen gas or an inert gas containing nitrogen to give a metal carbonitride;
   (j) a step in which a mixture comprising a metal M carbide except titanium carbide, a metal M nitride except titanium nitride and titanium oxide is heated in a nitrogen gas or an inert gas containing nitrogen to give a metal carbonitride;
   (k) a step in which a mixture comprising a metal M carbide except zirconium carbide and zirconium nitride is heated in a nitrogen gas or an inert gas containing nitrogen to give a metal carbonitride;
   (l) a step in which a mixture comprising a metal M carbide except titanium carbide and titanium nitride is heated in a nitrogen gas or an inert gas containing nitrogen to give a metal carbonitride;
   (m) a step in which a mixture comprising a metal M nitride except zirconium nitride and zirconium carbide is heated in a nitrogen gas or an inert gas containing nitrogen to give a metal carbonitride;
   (n) a step in which a mixture comprising a metal M nitride except titanium nitride and titanium carbide is heated in a nitrogen gas or an inert gas containing nitrogen to give a metal carbonitride.

3. The process according to claim 2, wherein the heating in the steps (a) to (n) is performed at a temperature in the range of 600 to 2200° C.

4. The process according to claim 1, wherein the heating in the step (X) is performed at a temperature in the range of 400 to 1400° C.

5. The process according to claim 1, wherein the inert gas used in the step (X) has an oxygen gas concentration in the range of 0.1 to 10% by volume.

6. The process according to claim 1, wherein the inert gas used in the step (X) contains hydrogen gas at a concentration of 0.01 to 5% by volume.

* * * * *